United States Patent
Lim et al.

(10) Patent No.: US 10,560,180 B2
(45) Date of Patent: Feb. 11, 2020

(54) GROUND RADIO STATION (GRS) APPARATUS AND RADIO STATION APPARATUS INCLUDED IN UNMANNED AERIAL VEHICLE (UAV)

(71) Applicant: Electronics and Telecommunications Research Institute, Daejeon (KR)

(72) Inventors: Kwang Jae Lim, Daejeon (KR); Hee Wook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 273 days.

(21) Appl. No.: 15/600,044

(22) Filed: May 19, 2017

(65) Prior Publication Data

US 2018/0217267 A1 Aug. 2, 2018

(30) Foreign Application Priority Data

Jan. 31, 2017 (KR) ........................ 10-2017-0014066

(51) Int. Cl.
  H04B 7/185 (2006.01)

(52) U.S. Cl.
  CPC ... H04B 7/185 (2013.01); *H04B 2201/70715* (2013.01)

(58) Field of Classification Search
  CPC .......................... H04B 7/184; H04B 7/18504
  See application file for complete search history.

(56) References Cited

U.S. PATENT DOCUMENTS

| | | | | |
|---|---|---|---|---|
| 8,185,221 B1* | 5/2012 | Stroili | ....................... | G01S 7/38 342/13 |
| 8,761,603 B1* | 6/2014 | Maleki | ................... | G01S 7/003 398/129 |
| 9,300,388 B1* | 3/2016 | Behroozi | ........... | H04B 7/18504 |
| 2004/0266375 A1* | 12/2004 | Li | ........................ | H04B 7/0811 455/140 |
| 2013/0070677 A1* | 3/2013 | Chang | ................. | G01S 13/9303 370/328 |
| 2013/0163565 A1 | 6/2013 | Lee et al. | | |
| 2014/0168010 A1* | 6/2014 | Mohamadi | ......... | H04B 7/18506 342/357.39 |

(Continued)

FOREIGN PATENT DOCUMENTS

KR 1020150117879 A 10/2015
KR 1020160107698 A 9/2016

OTHER PUBLICATIONS

Jim Griner, "Unmanned Aircraft Systems (UAS) Integration in the National Airspace System (NAS) Project", NASA Glenn Research Center, Apr. 22, 2015, pp. 1-21.

*Primary Examiner* — Marcus E Windrich
(74) *Attorney, Agent, or Firm* — William Park & Associates Ltd.

(57) ABSTRACT

A ground radio station (GRS) apparatus and a radio station apparatus included in an unmanned aerial vehicle (UAV) are provided. The GRS apparatus may include an antenna configured to transmit and receive a radio frequency (RF) signal, an RF and/or intermediate frequency (IF) (RF/IF) chain configured to perform a conversion between the RF signal and a baseband signal, a baseband transceiving processor configured to transmit and receive the baseband signal, and a BB-IF interface configured to map the baseband signal to the RF/IF chain or the baseband transceiving processor.

19 Claims, 13 Drawing Sheets

(56) References Cited

U.S. PATENT DOCUMENTS

| | | | |
|---|---|---|---|
| 2014/0195150 A1* | 7/2014 | Rios | B64C 39/024 |
| | | | 701/469 |
| 2016/0050012 A1* | 2/2016 | Frolov | H04B 7/18504 |
| | | | 455/431 |
| 2016/0192358 A1 | 6/2016 | Lee et al. | |
| 2017/0033455 A1* | 2/2017 | Husted | H01Q 3/02 |
| 2017/0059688 A1* | 3/2017 | Gan | G01S 3/325 |
| 2017/0069214 A1* | 3/2017 | Dupray | G08G 5/0021 |
| 2017/0235316 A1* | 8/2017 | Shattil | B64C 39/024 |
| | | | 701/3 |
| 2017/0317741 A1* | 11/2017 | Tiwari | H04B 7/18506 |

* cited by examiner

GROUND RADIO STATION (GRS) APPARATUS AND RADIO STATION APPARATUS INCLUDED IN UNMANNED AERIAL VEHICLE (UAV)

CROSS-REFERENCE TO RELATED APPLICATION

This application claims the benefit of Korean Patent Application No. 10-2017-0014066, filed on Jan. 31, 2017, in the Korean Intellectual Property Office, the disclosure of which is incorporated herein by reference.

BACKGROUND

1. Field of the Invention

At least one example embodiment relates to a ground radio station (GRS) apparatus and a radio station apparatus included in an unmanned aerial vehicle (UAV), and more particularly, to a point-to-point (P2P) and point-to-multipoint (P2MP) UAV control communication system with a high-reliability communication link while efficiently using a limited frequency in the national airspace.

2. Description of the Related Art

All components required for an entire flight process, including a control communication system, for example, takeoff/cruise, flight control, landing/retrieval, and the like, together with an unmanned aerial vehicle (UAV) (known as a pilotless aircraft or a drone) are exclusively referred to as an unmanned aircraft system (UAS) or a remotely piloted aircraft system (RPAS).

The UAS includes UAV ground control equipment, a UAV, and a data link. The data link refers to a wireless data link between a ground radio station (GRS) and the UAV, and may be broadly classified into a UAS ground control and non-payload communication (CNPC) data link and a UAS Payload Communication data link.

A UAS Payload Communication data link is a link used to transfer data associated with performing of tasks, and is generally wideband in comparison to a CNPC data link. The CNPC data link is a link used to transfer data associated with UAV flight control, UAS state monitoring, and CNPC link management, and includes a pilot/air traffic control (ATC) relay link and a UAS control link. The pilot/ATC relay link is a communication link used to relay voice and data between a pilot and an ATC through the UAV, and the UAS control link is a link used to transfer control information associated with navigation safety between the pilot and the UAV. The UAS control link may be classified into a telecommand (TC) link and a telemetry (TM) link. The TC link is an uplink used to transfer flight orbit control information, all of UAV system control information required for safe flight, and the like, from a pilot on the ground to the UAV. The TM link is a downlink used to transfer a location, altitude and speed of the UAV, UAS system operation mode and state, navigation aid data, tracking associated with detection and avoidance, a weather radar, video information, and the like, from the UAV to the pilot on the ground.

As a frequency for the UAV ground CNPC data link, a C band from 5030 megahertz (MHz) to 5091 MHz is generally considered. The C band is allocated as a new band for CNPC in the World Radiocommunication Conference, 2012 (WRC-12). A band may refer to frequency band. In addition, a band, for example, an L band from 960 MHz to 1164 MHz, allocated for an aeronautical mobile service may be considered, and a ITU-R regulation of the L band is prepared so that the L band is available for CNPC in the WRC-12. In the C band, a frequency jamming effect with an existing system and a multipath delay spread are relatively small. On the contrary, a directional antenna needs to be used to secure a link margin and a Doppler effect of the C band is great by five times in comparison to that of the L band. A low frequency band, for example the L band, allocated for an aeronautical mobile service is excellent in a propagation characteristic in comparison to the C band. The L band has a relatively low propagation loss of about 14 decibels (dB) in comparison to the C band. However, since a lot of existing aeronautical systems, for example, distance measurement equipment (DME), automatic dependent surveillance-broadcast (ADS-B), a tactical air navigation system (TACAN), and the like, are already being operated in the L band, it is difficult to secure some parts of the L band. In addition, the L band frequency has inherently larger multipath delay spread. Thus, the secured C band may be considered as a basic link of ground CNPC and a low frequency band (for example, the L band, an ultra high frequency (UHF), and the like) may be expected to be used to increase an availability of the CNPC data link for safety operation of a UAV. Of course, the C band and the low frequency band may be used in reverse or used independently.

Connection types of the ground CNPC data link may include a point-to-point (P2P) type and a point-to-multipoint (P2MP) type. In the P2P type, a single ground radio station (GRS) and a single unmanned aircraft (UA) forms a data link. The P2P type is generally considered in an existing UAS. In the P2MP type, a single GRS form data links with a plurality of UAs. Generally, in the P2MP type, GRSs are connected over a network, to support a GRS handover. In both the P2P type and P2MP type, GRSs may be connected over a network, and accordingly it is possible to provide a seamless UAV control communication service or to construct a single GRS. In the P2P type, a standalone GRS is generally deployed, and in the P2MP type, a network-based GRS is expected to be deployed. A network-based P2MP type capable of simultaneously forming communication links with a plurality of UAVs and also forming a national network is expected to be considered as a next generation CNPC data link. Technology associated with such a P2MP UAS CNPC system has not been actively proposed.

Also, a CNPC channel needs to be assigned to operate an UAS CNPC system. In an existing channel assignment scheme, a spectrum authority (referred to as an "SA") statically assigns a channel during a relatively long period of time, for example, generally, 1 year or longer, when a UAS CNPC system is registered. Thus, it is difficult to utilize a channel that is assigned to a specific UAS CNPC system at another UAS CNPC system even during the time when the specific UAS CNPC system is not operated.

Accordingly, there is a need to operate a UAV CNPC system in a way to efficiently utilize UAV control communication frequency resources that may efficiently operate a plurality of UAVs in a limited frequency band exclusive for controlling UAVs in order to achieve a safety operation of a UAV and expand a demand for UAVs. Also, to simultaneously support a plurality of UAVs in a single GRS, the GRS needs to support a dynamically assigned communication channel with the plurality of UAVs.

SUMMARY

An aspect of at least one example embodiment is to provide a technology of transmitting and receiving a channel by a ground radio station (GRS) apparatus and a radio station apparatus included in an unmanned aerial vehicle (UAV) in a UAV control communication system.

Another aspect of at least one example embodiment is to provide a technology of measuring a quality of a received signal using a measurement channel and of selecting transmission (Tx) and reception (Rx) channels based on the quality of the received signal, in a UAV control communication system.

According to an aspect, there is provided a GRS apparatus including an antenna configured to transmit and receive a radio frequency (RF) signal, an RF and/or intermediate frequency (IF) (RF/IF) chain configured to perform a conversion between the RF signal and a baseband signal, a baseband transceiving processor configured to transmit and receive the baseband signal, and a BB-IF interface configured to map the baseband signal to the RF/IF chain or the baseband transceiving processor.

The RF signal may have a C-band frequency or an L-band frequency. The antenna may include a plurality of sector antennas.

The plurality of sector antennas may include a plurality of medium-gain antennas (MGAs), and an omnidirectional antenna or a low-gain antenna (LGA).

The RF/IF chain may be configured to convert the RF signal for a total operating frequency band including any assignable channel frequency segments to the baseband signal in an Rx mode, and configured to convert the baseband channel signal to the RF signal for the total operating frequency band in a Tx mode.

The BB-IF interface may be configured to map the baseband channel signal from the RF/IF chain to the baseband transceiving processor in an Rx mode, and may be configured to map the baseband channel signal from the baseband transceiving processor to the RF/IF chain in a Tx mode.

In an Rx mode, the RF/IF chain may be configured to downconvert the RF signal for an total operating frequency bands including any assignable channel frequency segments to an analog IF or baseband signal, to convert the analog IF or baseband signal to a digital IF or baseband signal using an analog-to-digital converter (ADC) and analog low pass filter (LPF), and to channelize the digital IF or baseband signal to the baseband channel signal using a digital channelization.

In a Tx mode, the RF/IF chain may be configured to convert the baseband channel signal to a digital IF or baseband signal for the total operating frequency bands including any assignable channel frequency segments using a digital channelization, to convert the digital IF or baseband signal to an analog IF or baseband signal for the total operating frequency bands using a digital-to-analog converter (DAC), and to upconvert the analog IF or baseband signal to the RF signal.

The RF/IF chain may be configured to multiplex the digital IF or baseband signals.

The RF/IF chain may be configured to digital-channelize a specific channel received from the antenna, the BB-IF interface may be configured to map the digital-channelized channel to the baseband transceiving processor, and the baseband transceiving processor may be configured to measure a signal quality of the specific channel based on the digital-channelized channel.

The baseband transceiving processor may be configured to select a Tx antenna for each Tx channel based on the signal quality, the BB-IF interface may be configured to map the baseband channel signal to an RF/IF chain connected to the Tx antenna, and the RF/IF chain connected to the Tx antenna may be configured to multiplex the baseband signals and transmit the multiplexed signal to the Tx antenna.

An RF/IF chain connected to an Rx antenna for each Rx channel may be configured to receive the baseband signals from the Rx antenna, the BB-IF interface may be configured to map the baseband signals to the baseband transceiving processor, and the baseband transceiving processor may be configured to select the Rx antenna based on the signal quality and to combine a plurality of baseband signals from the mapped Rx antennas.

According to another aspect, there is provided a radio station apparatus included in a UAV, the radio station apparatus including an antenna configured to transmit and receive an RF signal of the total operating frequency band including at least one of a video channel or a CNPC channel of the UAV, an RF/IF chain configured to perform a conversion between the RF signal for the total operating frequency band and a baseband signal for an assigned channel frequency segment, a baseband transceiving processor configured to transmit and receive the baseband channel signal, and a BB-IF interface configured to map the baseband channel signal to the RF/IF chain or the baseband transceiving processor.

The RF/IF chain may be configured to convert the RF signal for a total operating frequency band to the baseband channel signal in an Rx mode, and configured to convert the baseband channel signal to the RF signal for the total operating frequency band in a Tx mode.

The BB-IF interface may be configured to map the baseband channel signal from the RF/IF chain to the baseband transceiving processor in an Rx mode, and may be configured to map the baseband channel signal from the baseband transceiving processor to the RF/IF chain in a Tx mode.

In an Rx mode, the RF/IF chain may be configured to downconvert the RF signal for an total operating frequency bands including any assignable channel frequency segments to an analog IF or baseband signal, to convert the analog IF or baseband signal to a digital IF or baseband signal using an ADC and a LPF, and to channelize the digital IF or baseband signal to the baseband channel signal using a digital channelization.

In a Tx mode, the RF/IF chain may be configured to convert the baseband channel signal to a digital IF or baseband signal for the total operating frequency band including any assignable frequency segments using a digital channelization, to convert the digital IF or baseband signal to an analog IF or baseband signal using a DAC, and to upconvert the analog IF or baseband signal to the RF signal for the total operating frequency band.

The RF/IF chain may be configured to multiplex the digital IF or baseband signals.

The RF/IF chain may be configured to digital-channelize a specific channel received from the antenna, the BB-IF interface may be configured to map the digital-channelized channel to the baseband transceiving processor, and the baseband transceiving processor may be configured to measure a signal quality of the specific channel based on the digital-channelized channel.

The baseband transceiving processor may be configured to select a Tx antenna for each Tx channel based on the signal quality, the BB-IF interface may be configured to map the baseband channel signal to an RF/IF chain connected to the Tx antenna, and the RF/IF chain connected to the Tx antenna may be configured to multiplex the baseband channel signals and transmit the multiplexed signal to the Tx antenna.

An RF/IF chain connected to an Rx antenna for each Rx channel may be configured to receive the baseband signal from the Rx antenna, the BB-IF interface may be configured to map the baseband signal to the baseband transceiving processor, and the baseband transceiving processor may be configured to select the Rx antenna based on the signal quality and to combine a plurality of baseband signals from the mapped Rx antennas.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
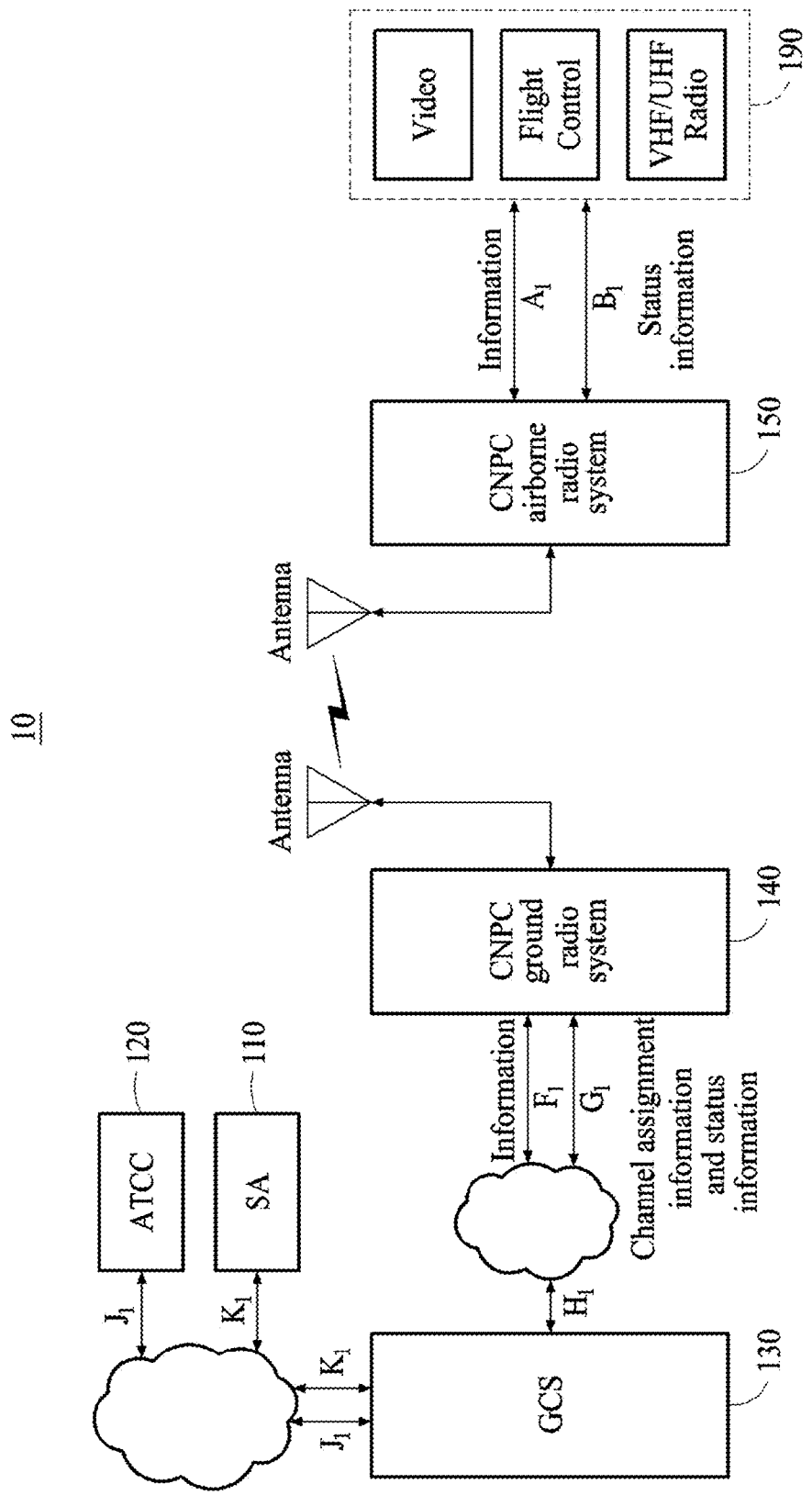
FIG. 1 is a diagram illustrating an example of information exchange and a relationship with neighboring systems for a safe operation of an unmanned aerial vehicle (UAV) in a UAV control and non-payload communication (CNPC) system according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

A term "module" described herein may refer to hardware for performing a function and an operation for each name to be described herein, may refer to computer program code to perform a specific function and operation, or may refer to an electronic recording medium, for example, a processor or a microprocessor, including computer program code to perform a specific function and operation.

Thus, the term "module" may refer to a functional and/or structural combination of hardware for implementing the technical idea of the present disclosure and/or software for driving the hardware.

FIG. 1 illustrates an example of information exchange and a relationship with neighboring systems for a safe operation of an unmanned aerial vehicle (UAV) in a UAV control and non-payload communication (CNPC) system 10 according to an example embodiment.

Referring to FIG. 1, the UAV CNPC system 10 may include a spectrum authority (SA) 110, an air traffic control center (ATCC) 120, a ground control station (GCS) 130, a CNPC ground radio system 140, and a CNPC airborne radio system 150.

The UAV CNPC system 10 may be a point-to-point (P2P) UAV CNPC system configured to control a UAV 190. The UAV 190 may include at least one of a video processor, a flight control processor or a very high frequency (VHF)/ultra high frequency (UHF) radio processor.

For an operation of the P2P UAV CNPC system, the GCS 130 may send a request for a channel to the SA 110 and the SA 110 may assign a channel to the GCS 130 in operation K1.

The GCS 130 may transmit ground/UAV CNPC radio channel assignment information and status information G1 and information F1 to the CNPC ground radio system 140 through a distribution system in operation H1. The information F1 may include UAV control data and communication data with the ATCC 120.

The CNPC ground radio system 140 may transfer information A1 to the flight control processor and VHF/UHF radio processor. The information A1 may include UAV control data and communication data with the ATCC 120, and accordingly may be substantially the same as the information F1. The UAV control data may include UAV telecommand and navigation setting data in uplink as well as UAV telemetry, navigation aid, detection and avoid, and video data. Also, the CNPC ground radio system 140 may transfer CNPC airborne radio status information B1 to the flight control processor.

The CNPC airborne radio system 150 may transfer the information A1 to the CNPC ground radio system 140. The CNPC ground radio system 140 may transfer the information F1 received from the CNPC airborne radio system 150, the CNPC radio channel assignment information and status information G1 to the GCS 130 via a wired/wireless network in operation HE A characteristic of the UAV CNPC system 10 will be described below.

Hereinafter, a link configuration for an operation of the UAV CNPC system 10 will be described.

1) The UAV CNPC system 10 may include a plurality of pairs of ground radio stations and airborne radio stations, and each of the ground stations and each of the airborne radio stations may form a one-to-one communication link.

2) When the UAV CNPC system 10 is a standalone system, the UAV CNPC system 10 may expand a coverage by handover to another ground radio station (GCS) connected to the GCS and control transfer to another GCS.

3) The UAV CNPC system 10 may implement a frequency-division multiple access (FDMA)-based ground station, to support a plurality of P2P UAV CNPC systems.

Hereinafter, configurations for operations of an uplink channel and a downlink channel of the UAV CNPC system 10 will be described.

1) The UAV CNPC system 10 may operate through an FDMA channel in an uplink from a ground station to an airborne radio station and a downlink from the airborne radio station to the ground station.

2) The UAV CNPC system 10 may simultaneously support transmission (Tx) and reception (Rx) in a dual frequency band channel (for example, an L band and a C band).

3) The UAV CNPC system 10 may support a plurality of data classes (DCs) with a plurality of channel bandwidths (for example, 30 kilohertz (kHz), 60 kHz, 90 kHz and 120 kHz).

4) The UAV CNPC system 10 may support different numbers of channel bandwidths for each link direction and for each frequency band.

5) The UAV CNPC system 10 may support DC1, DC2 or DC3 in the uplink, and may support DC1, DC2, DC3, DC4, DC5 or DC6 in the downlink.

6) The airborne radio station of the UAV CNPC system 10 may support simultaneous transmissions of two FDMA channels. For example, the two FDMA channels may be a single channel for controlling a UAV among DC1 through DC4, and a single channel for safety video among DC5 and DC6.

7) The UAV CNPC system 10 may operate in a fixed channel except a channel reassignment and handover.

Figure 2:
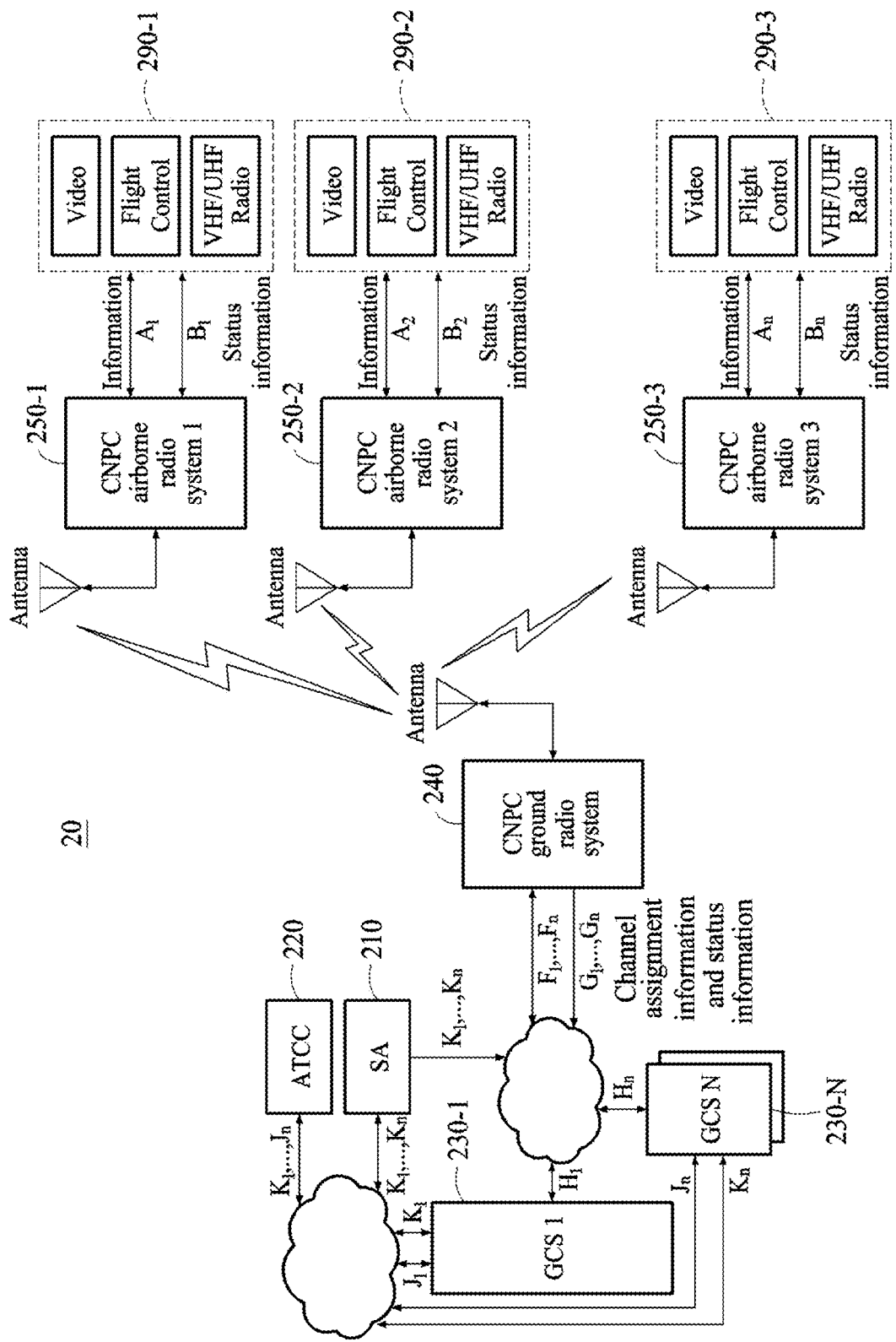
FIG. 2 is a diagram illustrating another example of information exchange and a relationship with neighboring systems for a safe operation of a UAV in a UAV CNPC system according to an example embodiment.

FIG. 2 illustrates another example of information exchange and a relationship with neighboring systems for a safe operation of a UAV in a UAV CNPC system 20 according to an example embodiment.

Referring to FIG. 2, the UAV CNPC system 20 may include a SA 210, an ATCC 220, GCSs 230-1 through 230-n, a CNPC ground radio system 240, and CNPC airborne radio systems 250-1 through 250-3. The UAV CNPC system 20 may be a point-to-multipoint (P2MP) UAV CNPC system configured to control UAVs 290-1 through 290-3. Each of the UAVs 290-1 through 290-3 may include at least one of a video processor, a flight control processor or a VHF/UHF radio processor.

Operations and configurations of the SA 210, the ATCC 220, the GCSs 230-1 through 230-N, the CNPC ground radio system 240, and the CNPC airborne radio systems 250-1 through 250-3 may be substantially the same as those of the SA 110, the ATCC 120, the GCS 130, the CNPC ground radio system 140, and the CNPC airborne radio system 150 of FIG. 1.

For convenience of description, three CNPC airborne radio systems, that is, the CNPC airborne radio systems 250-1 through 250-3 and three UAVs, that is, the UAVs 290-1 through 290-3 are shown in FIG. 2, however, there is no limitation thereto. For example, a plurality of CNPC airborne radio systems and a plurality of UAVs may be implemented.

For an operation of the P2MP UAV CNPC system, the GCSs 230-1 through 230-N may send a request for a channel to the SA 210, and the SA 210 may assign channels to the GCSs 230-1 through 230-N in operations K1 through Kn.

The GCSs 230-1 through 230-N may transmit information F1 that includes UAV control data and communication data with the ATCC 220 to the CNPC ground radio system 240 through a distribution system in operations H1 through Hn. The SA 210 may transmit UAV channel assignment information K1 through Kn to the CNPC ground radio system 240. The CNPC ground radio system 240 may transfer information A1 through An received from the GCSs 230-1 through 230-N to flight control processors and VHF/UHF radio processors of the UAVs 290-1 through 290-3 that are respectively controlled by the GCSs 230-1 through 230-N. The information A1 through An may include UAV control data and communication data with the ATCC 220, and accordingly may be substantially the same as the information F1 through Fn. The UAV control data may include UAV telecommand and navigation setting data in uplink as well as UAV telemetry, navigation aid, detection and avoid, and video data. Also, the CNPC ground radio system 240 may transmit CNPC airborne radio status information B1 through Bn to the flight control processors.

The CNPC airborne radio systems 250-1 through 250-3 may relay the information A1 through An from the VHF/

UHF radio processors to the CNPC ground radio system 240. The CNPC ground radio system 240 may transfer CNPC radio channel assignment information and status information G1 through Gn and the information F1 through Fn received from the CNPC airborne radio systems 250-1 through 250-3 to the GCSs 230-1 through 230-N in operations H1 through Hn.

A reliable communication service for safe control between the GCSs 230-1 through 230-N and the UAVs 290-1 through 290-3 provided by the UAV CNPC system 20 may vary depending on an uplink or a downlink. In the uplink, the communication service may include at least one of telecommand information, ATC relay information or NavAid setting information. In the downlink, the communication service may include at least one of telemetry information, ATC relay information, NavAid information, DAA target information, weather radar information, safety takeoff landing video information or emergency video information. The ATC relay information may include ATC audio and data relay information.

The UAV CNPC system 20 may define and provide various service classes to provide various services based on a channel capacity. The channel capacity may be a CNPC channel capacity for the UAVs 290-1 through 290-3.

For example, in the uplink, the CNPC airborne radio systems 250-1 through 250-3 may provide various service classes based on an assigned channel bandwidth or channel capacity by defining service classes as shown in Table 1 below. Also, in the downlink, the CNPC airborne radio systems 250-1 through 250-3 may provide various service classes based on an assigned channel bandwidth or channel capacity by defining service classes as shown in Table 2 below.

TABLE 1

|  | Service Class 1 | Service Class 2 | Service Class 3 |
|---|---|---|---|
| Telecommand | ○ | ○ | ○ |
| ATC Relay |  | ○ | ○ |
| NavAid Setting |  |  | ○ |

TABLE 2

|  | Service Class 1 | Service Class 2 | Service Class 3 | Service Class 4 | Service Class 5 | Service Class 6 |
|---|---|---|---|---|---|---|
| Telemetry | ○ | ○ | ○ | ○ |  |  |
| ATC Relay |  | ○ | ○ | ○ |  |  |
| NavAid |  |  | ○ | ○ |  |  |
| DAA Target |  |  | ○ | ○ |  |  |
| Weather Radar |  |  |  | ○ |  |  |
| Take-off landing video |  |  |  |  | ○ |  |
| Emergency video |  |  |  |  |  | ○ |

Services provided by the CNPC airborne radio systems 250-1 through 250-3 may necessarily include telecommand information (an uplink from a ground station to an airborne radio station) and telemetry information (a downlink from the airborne radio station to the ground station) in order to control the UAVs 290-1 through 290-3. In addition, based on a capability of a GRS and a radio station included in a UAV and an assigned channel capacity or bandwidth, at least one of TC/TM data, ATC relay information, NavAid information, DAA target information, weather radar information or video information may be further included.

The CNPC airborne radio systems 250-1 through 250-3 may provide video services (for example, safe takeoff and landing video information and/or emergency video information) that may be considered for takeoff and landing and emergency, through a single band (for example, a C band for controlling a UAV) of a separate downlink channel. In other words, the CNPC airborne radio systems 250-1 through 250-3 may simultaneously transmit a single service class among service classes 1 through 4, and a single service class among service classes 5 and 6 for takeoff and landing or en-route emergency, through different channels in the C band.

The UAV CNPC system 20 may operate in a dual band to satisfy a link availability of 99.999%. For example, the CNPC airborne radio systems 250-1 through 250-3 may operate in a dual band of a C band and an L band allocated for control of a UAV. The UAV CNPC system 20 may transmit the same information or different information in the dual band. When the CNPC airborne radio systems 250-1 through 250-3 transmit the same information, a signal diversity gain between the C band and L band may be obtained in a physical layer. When the CNPC airborne radio systems 250-1 through 250-3 transmit different information, the SA 210 may assign different bandwidths to the C band and L band.

The C band may be a frequency band used exclusively for a UAV and a whole frequency band of 61 megahertz (MHz), and may be utilized for a UAV CNPC. For example, the CNPC airborne radio systems 250-1 through 250-3 may transmit, in the C band, at least one of TC/TM data, ATC relay information, DAA target information or weather radar information.

In the L band, an interference with another aeronautical radio device may occur. For example, the CNPC airborne radio systems 250-1 through 250-3 may transmit TC/TM data in the L band. A characteristic of the UAV CNPC system 20 will be described below. Hereinafter, a link configuration for an operation of the UAV CNPC system 20 will be described.

1) The UAV CNPC system 20 may include a plurality of ground stations to simultaneously support a plurality of airborne radio stations.

2) When the UAV CNPC system 20 is connected over a network, the UAV CNPC system 20 may expand a coverage by a handover between ground stations connected via network.

3) The UAV CNPC system 20 may implement a time-division multiplexing (TDM)-based ground radio station, to support a plurality of airborne radio stations in a single ground radio station.

Hereinafter, configurations for operations of an uplink channel and a downlink channel of the UAV CNPC system 20 will be described.

1) The UAV CNPC system 20 may operate through a
 TDM channel in an uplink from a ground station to an airborne radio station.

2) The UAV CNPC system 20 may assign different TDM time slots for each airborne radio station, and may distinguish the airborne radio stations based on the TDM time slots.

3) The UAV CNPC system 20 may assign a fixed channel bandwidth (a number of TDM time slots) and a fixed frequency to a ground station. When long-term updating is performed, the UAV CNPC system 20 may change the fixed assignments (e.g. the number of TDM time slots).

4) The UAV CNPC system 20 may flexibly change a position and a number of time slots assigned to an airborne radio station that communicates with a corresponding ground station, to simultaneously support a plurality of airborne radio stations and efficiently support a channel change in a cell.

5) The UAV CNPC system 20 may operation through an FDMA channel in a downlink from an airborne radio station to a ground radio station.

6) The UAV CNPC system 20 may support simultaneous Tx and Rx in a dual band channel (for example, an L band and a C band).

7) The UAV CNPC system 20 may support a plurality of channel bandwidths (for example, eight channel bandwidths including 90 kHz, 180 kHz, 270 kHz, 360 kHz, 450 kHz, 540 kHz, 630 kHz and 720 kHz).

8) The UAV CNPC system 20 may support a number of TDM time slots determined based on an uplink channel bandwidth. For example, the UAV CNPC system 20 may support three time slots for 90 kHz, support six time slots for 180 kHz, and support 24 time slots for 720 kHz.

9) The UAV CNPC system 20 may support different numbers of channel bandwidths for each link direction and for each frequency band. For example, the UAV CNPC system 20 may support 90 kHz, 180 kHz, 270 kHz, 360 kHz, 450 kHz, 540 kHz, 630 kHz and 720 kHz in the uplink, and support 30 kHz, 60 kHz, 90 kHz, 120 kHz, 240 kHz and 480 kHz in the downlink.

10) An airborne radio station of the UAV CNPC system 20 may support simultaneous transmissions of two FDMA channels. For example, the two FDMA channels may be a single channel for controlling a UAV among DC1 through DC4, and a single channel for safety video among DC5 and DC6.

11) The UAV CNPC system 20 may operate in a fixed channel except a channel reassignment and handover.

Figure 3:
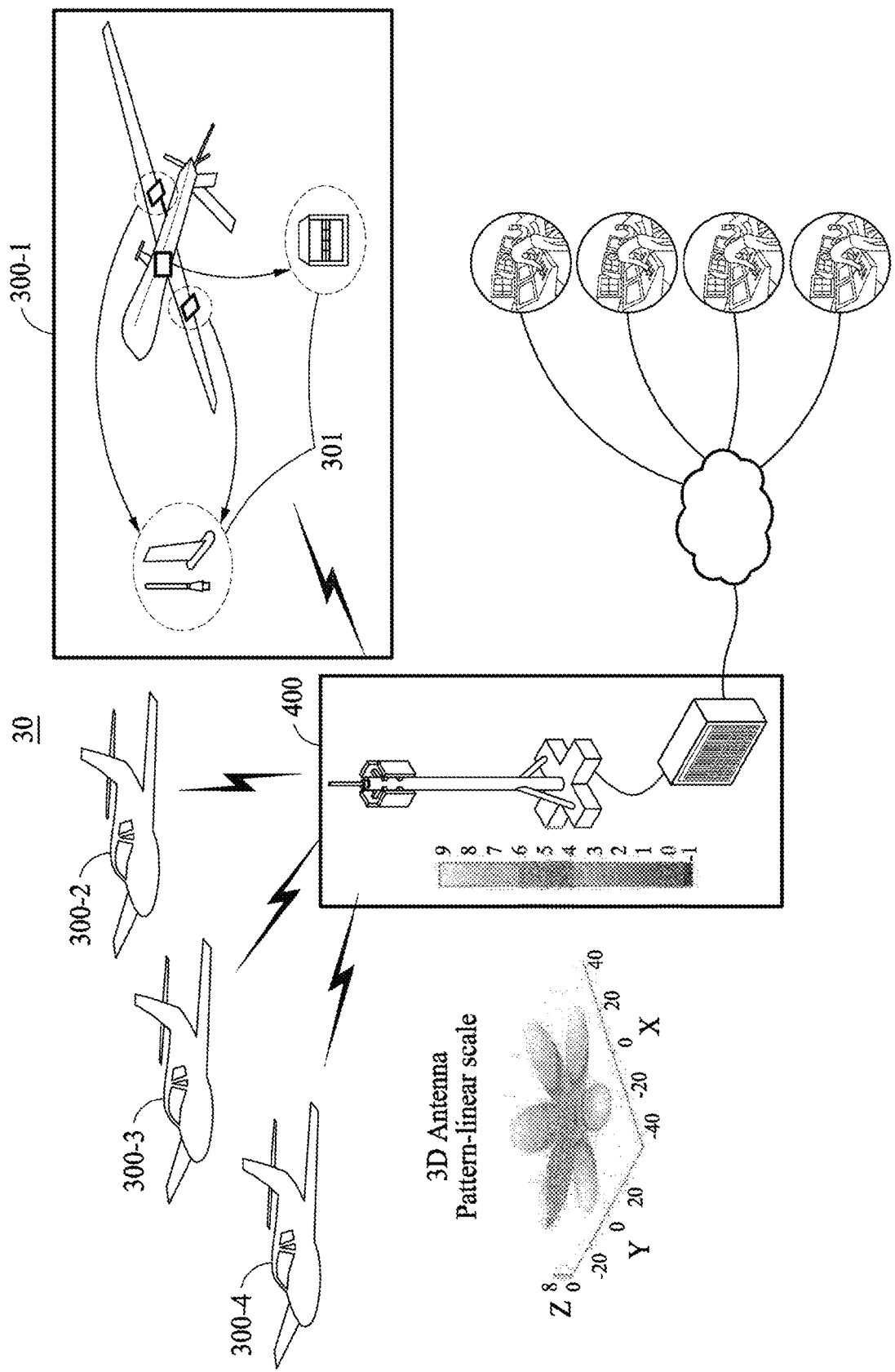
FIG. 3 is a diagram illustrating a concept of a UAV control communication system according to an example embodiment.

FIG. 3 illustrates a concept of a UAV control communication system 30 according to an example embodiment.

Referring to FIG. 3, properties and operations of the UAV CNPC system 30 may be substantially the same as those of the UAV CNPC systems 10 and 20 described above with reference to FIGS. 1 and 2.

The UAV CNPC system 30 may include a plurality of UAVs, for example, UAVs 300-1 through 300-4, and a GRS apparatus 400. Each of the UAVs 300-1 through 300-4 may include a radio station apparatus 301. The radio station apparatus 301 and the GRS apparatus 400 may support an uplink channel and a downlink channel.

Hereinafter, a configuration of each of a Tx channel and an Rx channel of the radio station apparatus 301 will be described.

1) Configuration of Tx Channel

The radio station apparatus 301 may transmit a single narrow band FDMA CNPC channel per frequency band and a single FDMA video channel in a specific frequency band.

A UAV to which a video channel is assigned among the UAVs 300-1 through 300-4 supported by the GRS apparatus 400 may perform Tx through the assigned video channel in a specific frequency band. For example, a UAV to which a video channel is assigned may perform Tx in a C band. In this example, a maximum number of assignable video channels may be three (for example, two video channels for takeoff and landing, and the other video channel for an en-route emergency).

A total number of Tx FDMA channels may be "$N_{band} \times N_d + N_v$." Here, $N_{band}$ may be 1 for a single frequency band support and may be 2 for a dual frequency band support, and $N_d$ may be 1. Also, $N_v$ may be less than or equal to 1, may be 1 when a video channel is assigned, and may be 0 when a video channel is not assigned.

2) Configuration of Rx Channel

The radio station apparatus 301 may receive a single narrow band FDMA CNPC channel per band.

A total number of Tx FDMA channels may be "$N_{band} \times N_d$." Here, $N_{band}$ may be 1 for a single frequency band support and may be 2 for a dual frequency band support, and $N_d$ may be 1.

Hereinafter, a configuration of each of a Tx channel and an Rx channel of the GRS apparatus 400 will be described. In a configuration of the Tx channel of the GRS apparatus 400, a number of Tx FDMA channels may be determined based on whether the UAV CNPC communication system 30 is of a P2P type or a P2MP type.

1) Configuration of Tx Channel (1) P2P Type

The GRS apparatus 400 may transmit $N_d$ narrow band FDMA channels per a frequency band for $N_d$ UAVs supported by a single GRS apparatus, that is, the GRS apparatus 400.

A total number of Tx FDMA channels may be "$N_{band} \times N_d$." Here, $N_{band}$ may be 1 for a single frequency band support and may be 2 for a dual frequency band support. Also, $N_d$ may be 1 for support of a single radio station apparatus included in a UAV, and may be greater than 1 for support of a plurality of P2P radio station apparatuses included in a UAV.

(2) P2MP Type

The GRS apparatus 400 may transmit a single narrow band TDM channel per frequency band to support a plurality of UAVs.

A total number of Tx FDMA channels may be "$N_{band} \times N_d$." Here, $N_{band}$ may be 1 for a single band support and may be 2 for a dual band support, and $N_d$ may be 1.

2) Configuration of Rx Channel

The GRS apparatus 400 may receive $N_d$ narrow band FDMA CNPC channels per a frequency band for $N_d$ UAVs supported by a single GRS apparatus, that is, the GRS apparatus 400, and may receive $N_v$ ($N_v \leq N_d$) narrow band FDMA video channels in a specific frequency band (for example, a C band).

The GRS apparatus 400 may perform Rx from UAVs to which video channels are assigned among the UAVs 300-1 through 300-4 supported by the GRS apparatus 400 in a specific frequency band. For example, the GRS apparatus 400 may perform Rx in a C band from UAVs to which video channels are assigned. In this example, a maximum number of assignable video channels may be three (for example, two video channels for takeoff and landing, and the other video channel for an en-route emergency).

A total number of Rx FDMA channels may be "$N_{band} \times N_d + N_v$." Here, $N_{band}$ may be 1 for a single band support and may be 2 for a dual band support, and $N_d$ may be 1 for support of a single radio station apparatus included in a UAV, and may be greater than 1 for support of a plurality of P2P radio station apparatuses included in a UAV. Also, $N_v$ may be less than or equal to 1 for support of a single radio station apparatus included in a UAV, and may be less than or equal to $N_d$ for support of a plurality of P2P radio station apparatuses included in a UAV.

In a P2P type or P2MP type UAV CNPC communication system 30, a single GRS apparatus, that is, the GRS apparatus 400 may include a plurality of antennas, and may support a plurality of UAVs (for example, the UAVs 300-1 through 300-4) that move in a three-dimensional (3D) space, that is, a plurality of radio station apparatuses (for example, the radio station apparatus 301) included in the UAVs. The GRS apparatus 400 may form a sector antenna-based radio station to have a plurality of antenna configurations.

The GRS apparatus 400 may include a sector antenna that tilts horizontally or upwards in a side and an antenna for supporting an upward direction, and may form a 3D cell coverage in airspace.

The GRS apparatus 400 may include a plurality of medium-gain sector antennas for supporting 360° in a far side direction, and a low-gain antenna (LGA) or an omnidirectional antenna for supporting 360° in a near upward direction. For example, the GRS apparatus 400 may include four through six medium-gain sector antennas and a single low-gain upper antenna that is a monopole antenna, a dipole antenna or a patch antenna.

In the GRS apparatus 400 based on a plurality of antennas, each of the antennas and a corresponding radio frequency (RF) and/or intermediate frequency (IF) (RF/IF) chain may support a CNPC channel with a plurality of radio station apparatuses 301 that are within a coverage processed by each of the antennas, and may support switching for each of the antennas based on movements of the UAVs 301-1 through 301-4. In other words, a corresponding RF/IF chain may perform a channelization to separate a plurality of UAV CNPC channels with various channel bandwidths received from a corresponding antenna. The corresponding RF/IF chain may convert all RF signals to digital signals and may perform a channelization in a digital side, to separate at least 20 CNPC channels with at least five types of bandwidths.

Also, the GRS apparatus 400 may measure signals for each of the antennas and may select a Tx antenna and an Rx antenna.

In medium and large UAVs, radio station apparatuses 301 included in the UAVs may include high-gain tracking antennas.

In UAVs other than the medium and large UAVs, radio station apparatuses 301 in the UAVs may use an omnidirectional antenna and a low-gain fixed antenna based on UAV SWaP. Here, the radio station apparatuses 301 may include a plurality of antennas to enhance a performance. For example, the radio station apparatus 301 may include two omnidirectional antennas that are spaced apart by an appropriate distance from each other. The radio station apparatus 301 may select a Tx antenna with a good link state based on movement of a UAV, may simultaneously receive signals from two Rx antennas and may acquire a diversity gain of the received signals.

For a CNPC channel with at least ten types of bandwidths, the radio station apparatus 301 may perform a digital channelization similar to that of the GRS apparatus 400, instead of performing a channelization using an analog filter bank.

For convenience of description, four UAVs, that is, the UAVs 300-1 through 300-4, are described in FIG. 3, however, there is no limitation thereto. Accordingly, the GRS apparatus 400 may communicate with a plurality of UAVs.

Figure 4:
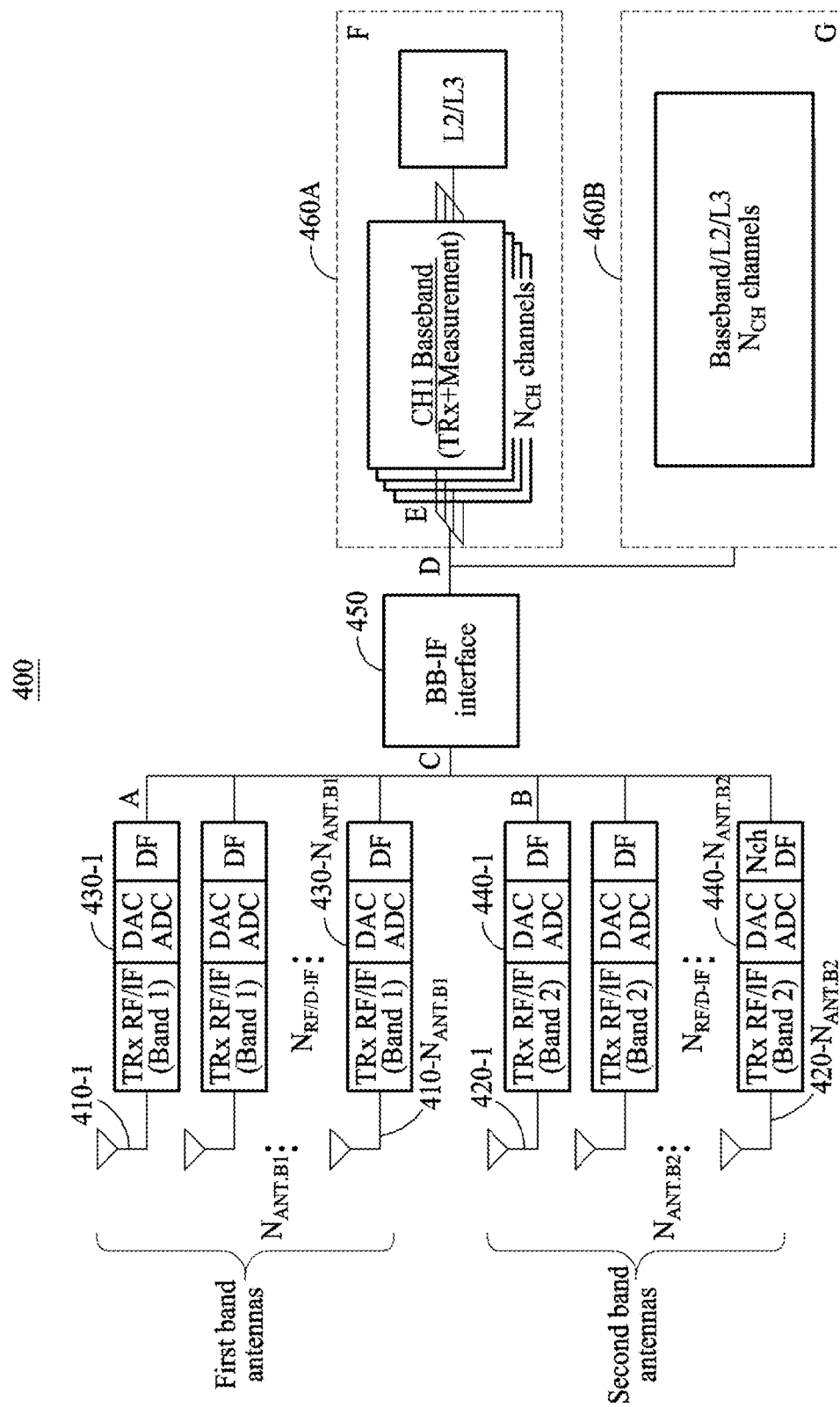
FIG. 4 is a diagram illustrating an example of a structure of a ground radio station (GRS) apparatus of FIG. 3.
Figure 5:
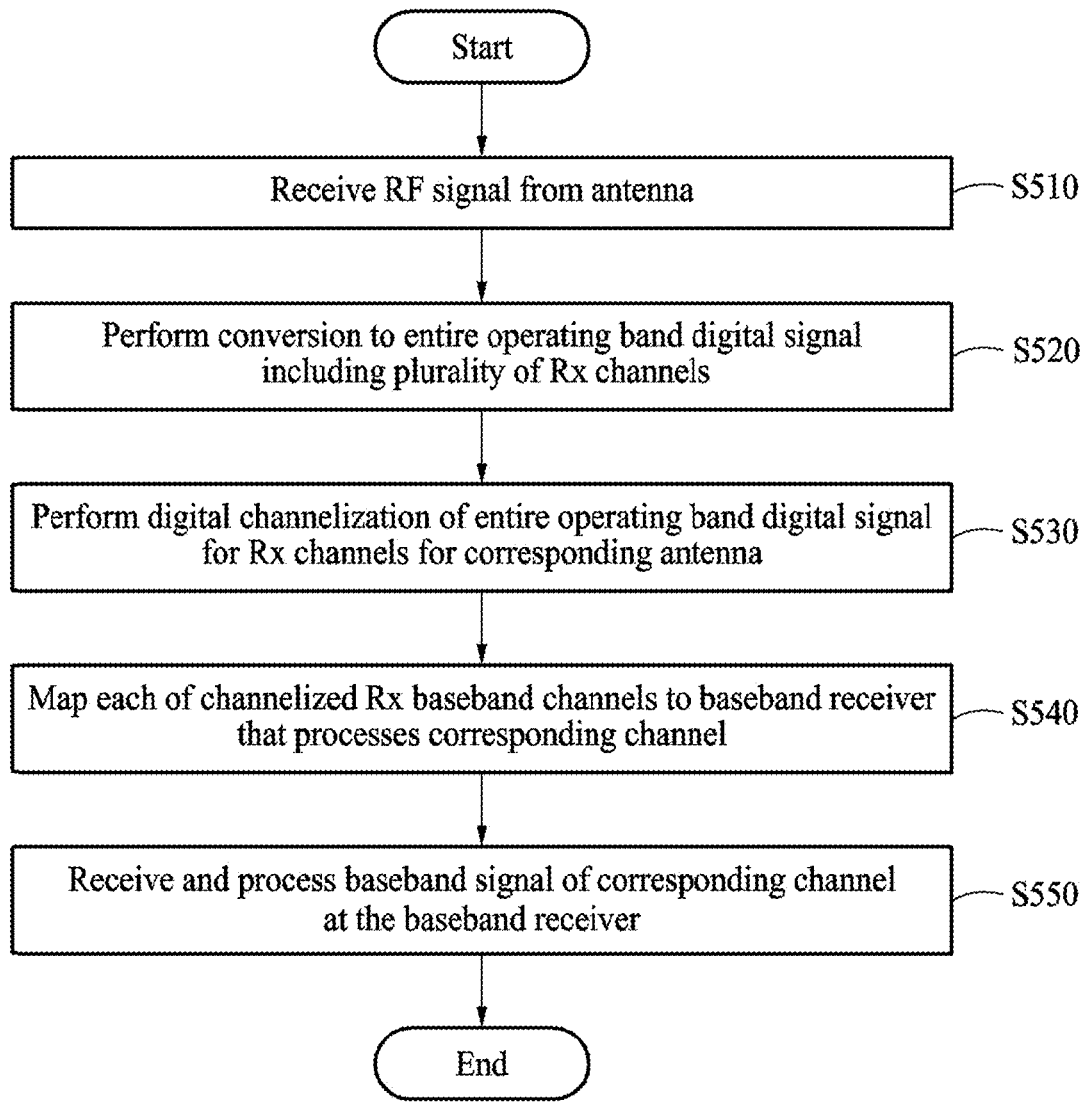
FIG. 5 is a diagram illustrating an example of a reception (Rx) operation of the GRS apparatus of FIG. 3.
Figure 6:
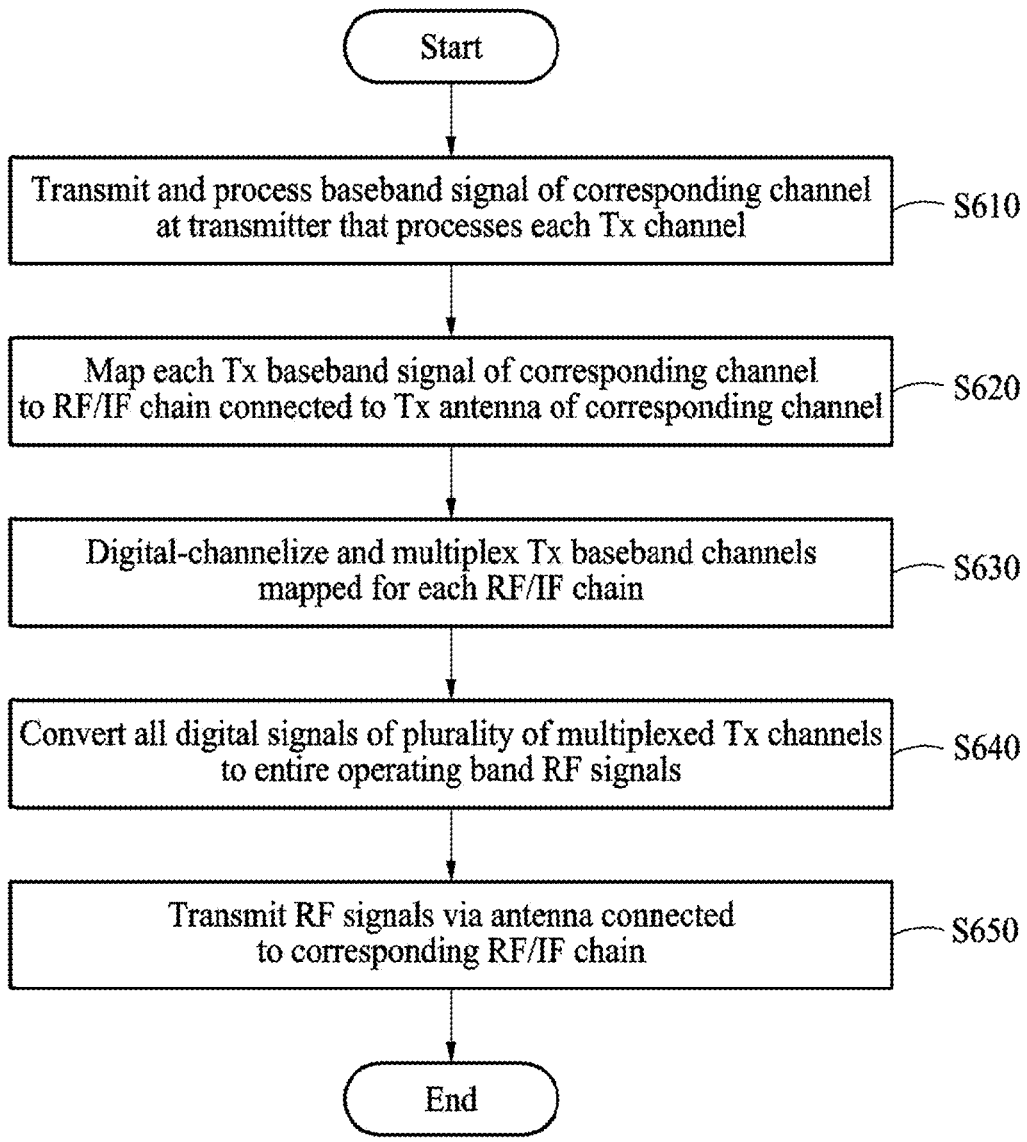
FIG. 6 is a diagram illustrating an example of a transmission (Tx) operation of the GRS apparatus of FIG. 3.

FIG. 4 illustrates an example of a structure of the GRS apparatus 400 of FIG. 3, FIG. 5 illustrates an example of an Rx operation of the GRS apparatus 400, and FIG. 6 illustrates an example of a Tx operation of the GRS apparatus 400.

Referring to FIGS. 4 through 6, the GRS apparatus 400 may include antennas 410-1 through 410-$N_{ANT.B1}$ and 420-1 through 420-$N_{ANT.B2}$, RF/IF chains 430-1 through 430-$N_{ANT.B1}$ and 440-1 through 440-$N_{ANT.B2}$, a BB-IF interface 450, and a baseband transceiving processor 460A or 460B.

The antennas 410-1 through 410-$N_{ANT.B1}$ and 420-1 through 420-$N_{ANT.B2}$ may receive RF signals in operation S510, or may transmit RF signals in operation S650. For example, the antennas 410-1 through 410-$N_{ANT.B1}$ and 420-1 through 420-$N_{ANT.B2}$ may receive RF signals and transfer the RF signals to the RF/IF chains 430-1 through 430-$N_{ANT.B1}$ and 440-1 through 440-$N_{ANT.B2}$. Also, the antennas 410-1 through 410-$N_{ANT.B1}$ and 420-1 through 420-$N_{ANT.B2}$ may receive RF signals from the RF/IF chains 430-1 through 430-$N_{ANT.B1}$ and 440-1 through 440-$N_{ANT.B2}$ and may transmit the RF signals. The antennas 410-1 through 410-$N_{ANT.B1}$ and 420-1 through 420-$N_{ANT.B2}$ may transmit and receive RF signals to and from the radio station apparatus 301.

Hereinafter, the antennas 410-1 through 410-$N_{ANT.B1}$ may be referred to as "first frequency band antennas 410-1 through 410-$N_{ANT.B1}$," and the antennas 420-1 through 420-$N_{ANT.B2}$ may be referred to as "second frequency band antennas 420-1 through 420-$N_{ANT.B2}$." A number of the first frequency band antennas 410-1 through 410-$N_{ANT.B1}$ may be "$N_{ANT.B1}$," and a number of the second frequency band antennas 420-1 through 420-$N_{ANT.B2}$ may be "$N_{ANT.B2}$."

A first frequency band and a second frequency band may be used for a dual frequency band operation to increase a link availability. The first frequency band may correspond to a C-band frequency assigned to control a UAV, and the second frequency band may correspond to an L-band frequency assigned to control a UAV. $N_{ANT.B1}$ and $N_{ANT.B2}$ may be the same as or different from each other based on a configuration scenario of the UAV control communication system 30. When $N_{ANT.B1}$ and $N_{ANT.B2}$ are the same, the UAV control communication system 30 may have the same communication coverage for the first frequency band and the second frequency band.

For convenience of description, the first frequency band antennas 410-1 through 410-$N_{ANT.B1}$ are logically separated from the second frequency band antennas 420-1 through 420-$N_{ANT.B2}$ as shown in FIG. 4, however, there is no limitation thereto. Accordingly, the first frequency band antennas 410-1 through 410-$N_{ANT.B1}$ and the second frequency band antennas 420-1 through 420-$N_{ANT.B2}$ may be implemented as a single antenna that supports a dual frequency band.

In a P2P structure in which a single GRS apparatus, that is, the GRS apparatus 400 supports a single radio station apparatus, that is, the radio station apparatus 301, the GRS apparatus 400 may include and use a tracking antenna.

In a P2P structure or a P2MP structure in which a single GRS apparatus, that is, the GRS apparatus 400 supports a plurality of radio station apparatuses, that is, the radio station apparatus 301, the GRS apparatus 400 may include and use a tracking antenna for each support UAV, or may include or use a plurality of sector antennas.

A plurality of sector antennas may include a sector antenna that tilts horizontally or upwards in a side and an antenna for supporting an upward direction, and may form a 3D cell coverage in airspace. The plurality of sector antennas may be the same as those of FIG. 3.

The antennas 410-1 through 410-$N_{ANT.B1}$ and 420-1 through 420-$N_{ANT.B2}$ may be connected to the RF/IF chains 430-1 through 430-$N_{ANT.B1}$ and 440-1 through 440-$N_{ANT.B2}$, respectively. For example, each of the antennas 410-1 through 410-$N_{ANT.B1}$ and 420-1 through 420-$N_{ANT.B2}$ may be connected, using a subminiature version A (SMA) connector, to each of the RF/IF chains 430-1 through 430-$N_{ANT.B1}$ and 440-1 through 440-$N_{ANT.B2}$.

The RF/IF chains 430-1 through 430-$N_{ANT.B1}$ and 440-1 through 440-$N_{ANT.B2}$ may perform a conversion between an RF signal and a baseband signal.

In an Rx mode, the RF/IF chains 430-1 through 430-$N_{ANT.B1}$ and 440-1 through 440-$N_{ANT.B2}$ may convert RF signals received from the antennas 410-1 through 410-$N_{ANT.B1}$ and 420-1 through 420-$N_{ANT.B2}$ to digital IF signals for a total operating frequency band in operation S520. The RF/IF chains 430-1 through 430-$N_{ANT.B1}$ and 440-1 through 440-$N_{ANT.B2}$ may convert the digital IF signals to baseband channel signals using a digital channelization in operation S530. Depending on example embodiments, the RF/IF chains 430-1 through 430-$N_{ANT.B1}$ and 440-1 through 440-$N_{ANT.B2}$ may convert RF signals directly to the baseband signals for a total operating frequency band. And then, the RF/IF chains 430-1 through 430-$N_{ANT.B1}$ and 440-1 through 440-$N_{ANT.B2}$ may convert the baseband signals to baseband channel signals using a digital channelization in operation S530. The RF/IF chains 430-1 through 430-$N_{ANT.B1}$ and 440-1 through 440-$N_{ANT.B2}$ may transfer the baseband signals to the BB-IF interface 450.

In a Tx mode, the RF/IF chains 430-1 through 430-$N_{ANT.B1}$ and 440-1 through 440-$N_{ANT.B2}$ may digital-channelize and multiplex baseband channel signals mapped by the BB-IF interface 450 in operation S630. Through the above digital channelization of the RF/IF chains 430-1 through 430-$N_{ANT.B1}$ and 440-1 through 440-$N_{ANT.B2}$, the baseband channel signals may be converted to digital IF signals for a total frequency band. The RF/IF chains 430-1 through 430-$N_{ANT.B1}$ and 440-1 through 440-$N_{ANT.B2}$ may convert the baseband signals that are digital-channelized and multiplexed, to RF signals in operation S640. Depending on example embodiments, the RF/IF chains 430-1 through 430-$N_{ANT.B1}$ and 440-1 through 440-$N_{ANT.B2}$ may convert baseband channel signals to baseband signals for a total frequency band and then, convert the baseband signal directly to RF signals. The RF/IF chains 430-1 through 430-$N_{ANT.B1}$ and 440-1 through 440-$N_{ANT.B2}$ may transfer the RF signals to the antennas 410-1 through 410-$N_{ANT.B1}$ and 420-1 through 420-$N_{ANT.B2}$.

The BB-IF interface 450 may connect the RF/IF chains 430-1 through 430-$N_{ANT.B1}$ and 440-1 through 440-$N_{ANT.B2}$ and the baseband transceiving processor 460A or 460B. The BB-IF interface 450 may map baseband channel signals to the RF/IF chains 430-1 through 430-$N_{ANT.B1}$ and 440-1 through 440-$N_{ANT.B2}$, or to the baseband transceiving processor 460A or 460B.

For example, in the Rx mode, the BB-IF interface 450 may map the digital-channelized baseband signals (for Rx baseband channels) to the baseband transceiving processor 460A or 460B in operation S540. In this example, the BB-IF interface 450 may map the digital-channelized baseband signals to the baseband transceiving processor 460A or 460B that processes a corresponding channel.

In the Tx mode, the BB-IF interface 450 may map Tx baseband channels to the RF/IF chains 430-1 through 430-$N_{ANT.B1}$ and 440-1 through 440-$N_{ANT.B2}$ in operation S620. In this example, the BB-IF interface 450 may map the Tx baseband channels to the RF/IF chains 430-1 through 430-$N_{ANT.B1}$ and 440-1 through 440-$N_{ANT.B2}$ that process corresponding channels. The BB-IF interface 450 may receive the Tx baseband channels from the baseband transceiving processor 460A or 460B.

Also, in the Rx mode, the BB-IF interface 450 may receive signals through at least one specific antenna among the antennas 410-1 through 410-$N_{ANT.B1}$ and 420-1 through 420-$N_{ANT.B2}$ for each channel supported by a single GRS apparatus (for example, the GRS apparatus 400). When corresponding channel signals are received via at least two specific antennas among the antennas 410-1 through 410-$N_{ANT.B1}$ and 420-1 through 420-$N_{ANT.B2}$, the baseband transceiving processor 460A or 460B may obtain a diversity gain of the received signals for each channel. The following description is provided on an example in which corresponding channel signals are received via at least two specific antennas among the antennas 410-1 through 410-$N_{ANT.B1}$ and 420-1 through 420-$N_{ANT.B2}$.

The RF/IF chains 430-1 through 430-$N_{ANT.B1}$ and 440-1 through 440-$N_{ANT.B2}$ may generate baseband signals for channels that are to receive signals. The RF/IF chains 430-1 through 430-$N_{ANT.B1}$ and 440-1 through 440-$N_{ANT.B2}$ may be connected to the antennas 410-1 through 410-$N_{ANT.B1}$ and 420-1 through 420-$N_{ANT.B2}$, respectively. The RF/IF chains 430-1 through 430-$N_{ANT.B1}$ and 440-1 through 440-$N_{ANT.B2}$ may generate baseband signals using a digital channelization. The BB-IF interface 450 may map the generated baseband signals to the baseband transceiving processor 460A or 460B that processes corresponding channels.

For example, the GRS apparatus 400 may receive a channel 1. A second antenna 410-2 for the first frequency band and a second antenna 420-3 for the second frequency band may receive the channel 1. RF/IF chains 430-2 and 440-3 connected to the second antenna 410-2 and the third antenna 420-3, respectively, may acquire baseband signals (for Rx baseband channels) for the channel 1 through the digital channelization, and may transfer the baseband signals to the BB-IF interface 450. The BB-IF interface 450 may map the baseband signals to the baseband transceiving processor 460A or 460B that processes the channel 1.

When channels are not received simultaneously in the first frequency band and the second frequency band at all times, or when different numbers are assigned to the antennas 410-1 through 410-$N_{ANT.B1}$ and 420-1 through 420-$N_{ANT.B2}$ as Rx antennas for each frequency band, the BB-IF interface 450 may properly map each of baseband signals (for channels) generated at the baseband transceiving processor 460A or 460B to the RF/IF chains 430-1 through 430-$N_{ANT.B1}$ and 440-1 through 440-$N_{ANT.B2}$ for each frequency band, based on an operation scenario.

When the GRS apparatus 400 receives $N_d$ CNPC channels through the first frequency band and the second frequency band, and supports Rx of $N_v$ video channels through the first frequency band, the RF/IF chains 430-1 through 430-$N_{ANT.B1}$ and 440-1 through 440-$N_{ANT.B2}$ for the first frequency band may perform a channelization for up to "$N_d$ $N_v$." Rx channels. Accordingly, A corresponding to the first frequency band may support signals corresponding to up to "$N_d+N_v$," Rx baseband channels. An RF/IF chain for the second frequency band may perform a channelization for up to $N_d$ Rx channels. Accordingly, B corresponding to the second frequency band may provide an interface (for example, peripheral component interconnect express (PCIe) or serial RapidIO (sRIO)) that may support signals for $N_d$ Rx baseband channels.

In the Tx mode, the BB-IF interface 450 may transmit a signal generated at the baseband transceiving processor 460A or 460B, for each channel supported by the GRS apparatus 400, via at least one specific antenna among the antennas 410-1 through 410-$N_{ANT.B1}$ and 420-1 through 420-$N_{ANT.B2}$.

For example, the GRS apparatus 400 may transmit a channel 1. The second antenna 410-2 for the first frequency band and a second antenna 420-2 for the second frequency band may transmit the channel 1. The BB-IF interface 450 may map a baseband signal for the channel 1 to RF/IF chains 430-2 and 440-2 that are connected to the second antenna 410-2 and the second antenna 420-2, respectively.

In other words, a number of baseband signals corresponding to a maximum number of channels supported by the GRS apparatus 400 for each of the RF/IF chains 430-1 through 430-$N_{ANT.B1}$ and 440-1 through 440-$N_{ANT.B2}$ may be mapped, which may be supported by interfaces of A and B.

Also, when channels are not transmitted simultaneously in the first frequency band and the second frequency band at all times, or when different numbers are assigned to the antennas 410-1 through 410-$N_{ANT.B1}$ and 420-1 through 420-$N_{ANT.B2}$ as Tx antennas for each frequency band, the BB-IF interface 450 may properly map each of baseband signals (for channels) generated at the baseband transceiving processor 460A or 460B to the RF/IF chains 430-1 through 430-$N_{ANT.B1}$ and 440-1 through 440-$N_{ANT.B2}$ for each frequency band, based on an operation scenario.

When the GRS apparatus 400 supports Tx of $N_d$ CNPC channels through the first frequency band and the second frequency band, A and B may provide interfaces (for example, PCIe or sRIO) that may support up to $N_d$ Tx baseband signals.

In operation S550, the baseband transceiving processor 460A or 460B may receive and process a baseband signal (for an Rx baseband channel) mapped to a corresponding channel. Accordingly, each receiver that processes each channel may process a baseband signal (for an Rx baseband channel).

In operation S610, the baseband transceiving processor 460A or 460B may process a baseband signal (for a Tx baseband channel) and may transfer the baseband signal to the BB-IF interface 450 in. Each transmitter that processes each channel may process a baseband signal (for a Tx baseband channel).

For example, the baseband transceiving processor 460A may include a plurality of transceiving modules that process a specific channel. The baseband transceiving processor 460B may include a single module that processes Tx and Rx of all channels.

The baseband transceiving processor 460A or 460B may be implemented as, for example, a field-programmable gate array (FPGA), a digital signal processor (DSP), and the like.

In an example, when the baseband transceiving processor 460A or 460B is implemented as an FPGA, a plurality of transceiving modules may be included in the baseband transceiving processor 460A or 460B. In another example, when the baseband transceiving processor 460A or 460B is implemented as a DSP, a single module to process Tx and Rx of all channels may be included in the baseband transceiving processor 460A or 460B. Here, a number of channels processed by a single module may change based on specifications of the FPGA or the DSP.

The baseband transceiving processor 460A that processes a specific channel may transfer a signal for a Tx baseband channel to the BB-IF interface 450, and the BB-IF interface 450 may map the signal to the RF/IF chains 430-1 through 430-$N_{ANT.B1}$ and 440-1 through 440-$N_{ANT.B2}$ that are connected to Tx antennas for the Tx baseband channel among the antennas 410-1 through 410-$N_{ANT.B1}$ and 420-1 through 420-$N_{ANT.B2}$. Also, the baseband transceiving processor 460A may receive a signal for an Rx baseband channel from the BB-IF interface 450. The BB-IF interface 450 may receive the signal for the Rx baseband channel from the RF/IF chains 430-1 through 430-$N_{ANT.B1}$ and 440-1 through 440-$N_{ANT.B2}$ that are connected to Rx antennas for the Rx baseband channel among the antennas 410-1 through 410-$N_{ANT.B1}$ and 420-1 through 420-$N_{ANT.B2}$.

When the same Tx baseband signals are transmitted to the first frequency band and the second frequency band, the baseband transceiving processor 460A may transfer a single Tx baseband signal per specific channel to the BB-IF interface 450. When different Tx baseband signals are transmitted to the first frequency band and the second frequency band, the baseband transceiving processor 460A may transfer a Tx baseband signal for the first frequency band and a Tx baseband signal for the second frequency band per specific channel to the BB-IF interface 450.

The baseband transceiving processor 460A may receive Rx baseband signals corresponding to a number of antennas that perform Rx for each frequency band from the BB-IF interface 450. For example, the baseband transceiving processor 460A may receive a channel 1 from the first frequency band and the second frequency band and may receive signals via two antennas per band. The baseband transceiving processor 460A that processes the channel 1 may receive two Rx baseband signals per band from the BB-IF interface 450. In other words, E of the baseband transceiving processor 460A may provide an interface that may support Ni Tx baseband signals (for example, Ni is 1 when the same signal is transmitted in a single band or a dual band, and Ni is 2 when different signals are transmitted in a dual band), and support "$2 \times N_{RxANT}$" (that is, a number of combined Rx antennas) Rx baseband signals.

The baseband transceiving processor 460B may process Tx and Rx of all channels using a single module. Accordingly, D may provide an interface that may support "Nch× Ni" Tx baseband signals when "Nch" Tx channels are present, and support "N'ch×$2 \times N_{RxANT}$" Rx baseband signals when "N'ch" Rx channels are present.

Figure 7:
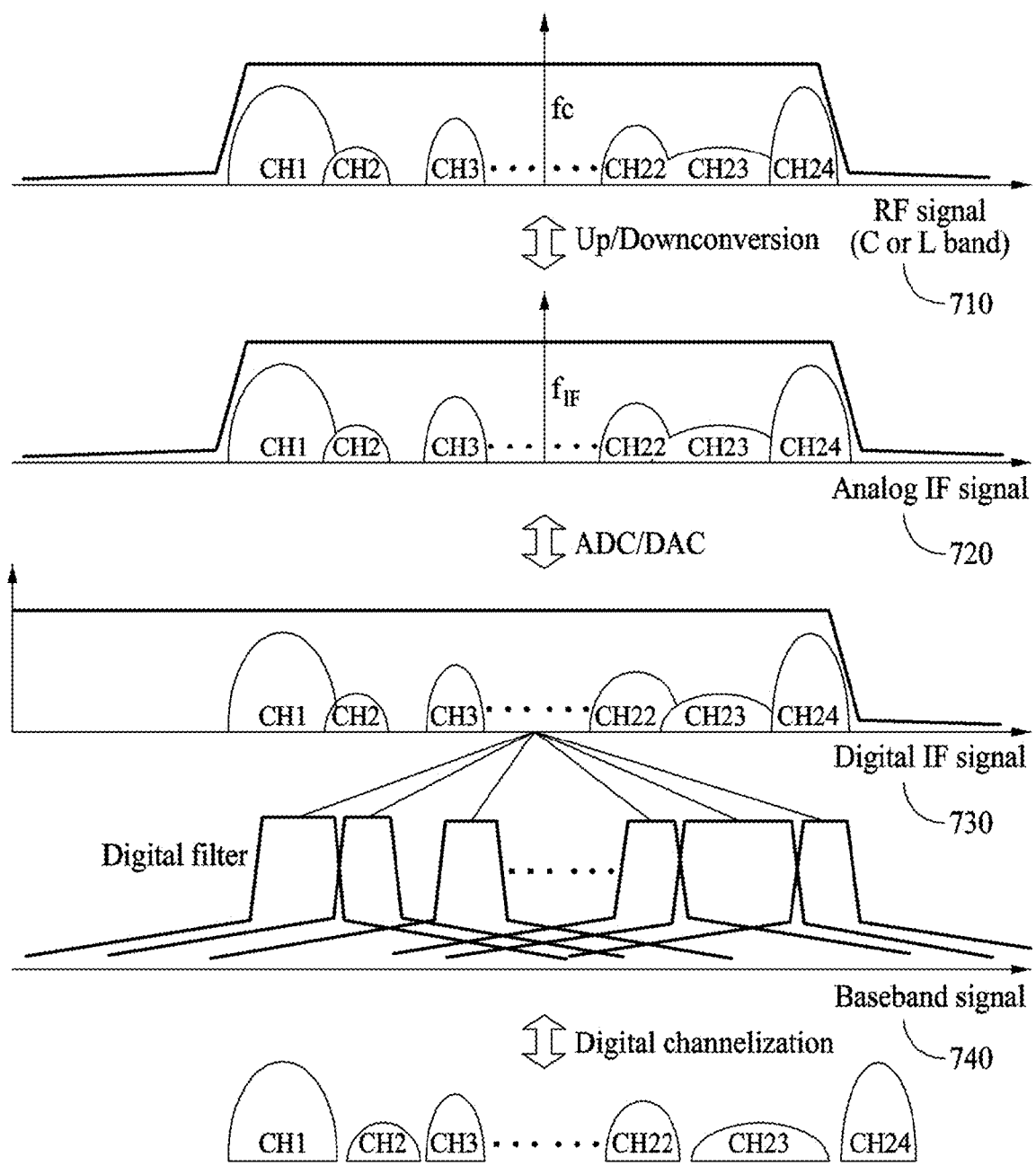
FIG. 7 is a diagram illustrating an example of a conversion operation of a radio frequency (RF) and/or intermediate frequency (IF) (RF/IF) chain of FIG. 4.
Figure 8:
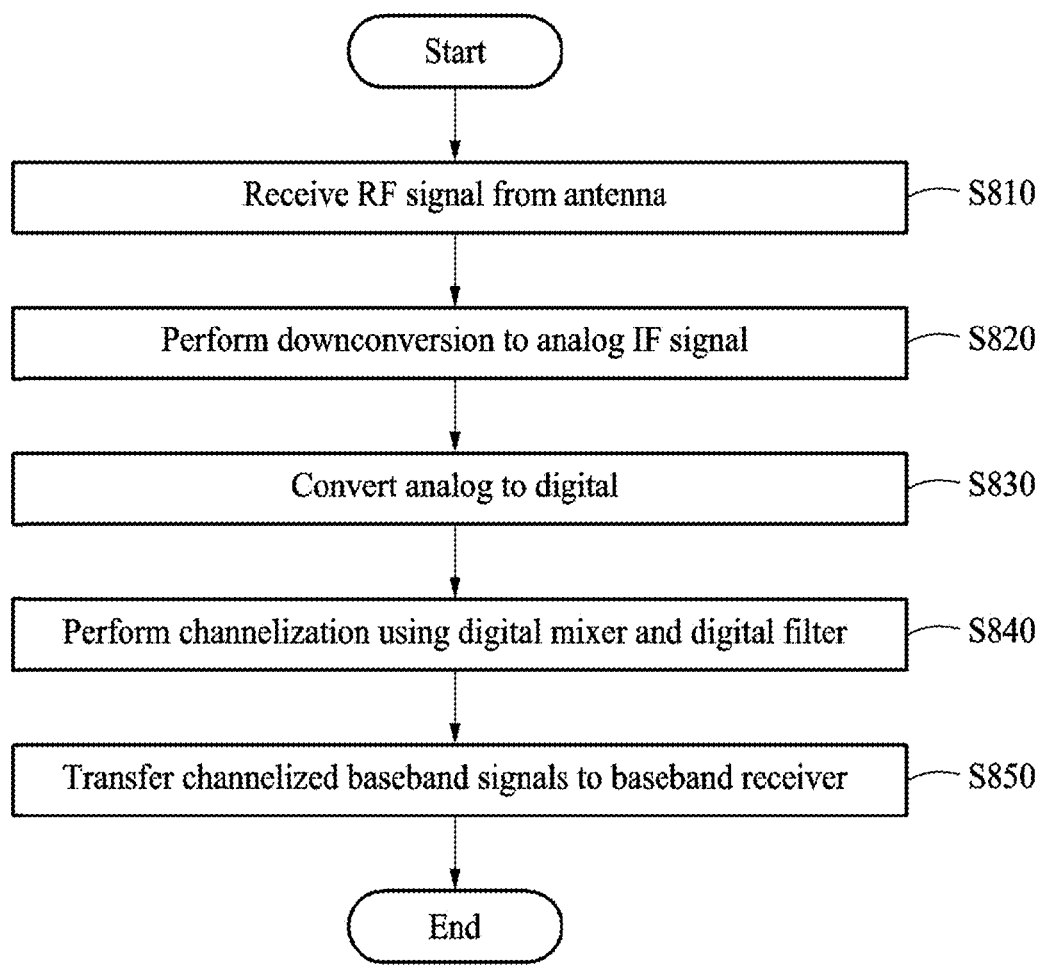
FIG. 8 is a diagram illustrating an example of an Rx operation of the RF/IF chain of FIG. 4.
Figure 9:
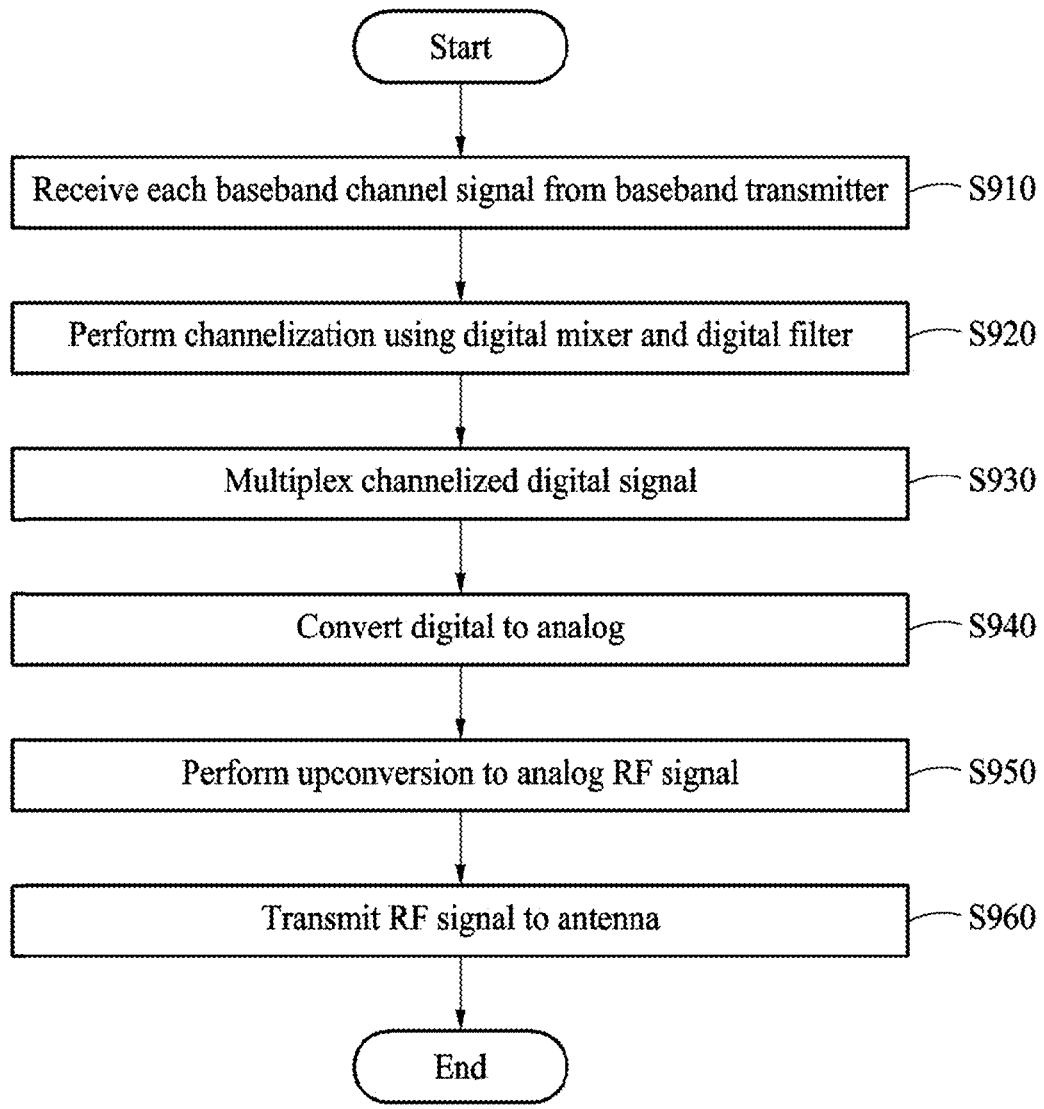
FIG. 9 is a diagram illustrating an example of a Tx operation of the RF/IF chain of FIG. 4.

FIG. 7 illustrates an example of a conversion operation of the RF/IF chains 430-1 through 430-$N_{ANT.B1}$ and 440-1 through 440-$N_{ANT.B2}$ of FIG. 4, FIG. 8 illustrates an example of an Rx operation of the RF/IF chains 430-1 through 430-$N_{ANT.B1}$ and 440-1 through 440-$N_{ANT.B2}$ of FIG. 4, and FIG. 9 illustrates an example of a Tx operation of the RF/IF chains 430-1 through 430-$N_{ANT.B1}$ and 440-1 through 440-$N_{ANT.B2}$ of FIG. 4.

Referring to FIGS. 7 through 9, the RF/IF chains 430-1 through 430-$N_{ANT.B1}$ and 440-1 through 440-$N_{ANT.B2}$ may be implemented as RF/D-IF chains to perform Tx and Rx through channels of the UAVs 300-1 through 300-4 with variable operating frequencies. The RF/IF chains 430-1 through 430-$N_{ANT.B1}$ and 440-1 through 440-$N_{ANT.B2}$ may perform a conversion between an RF signal 710 and a baseband signal 740. In the following description, a conversion operation of the RF/IF chains 430-1 through 430-$N_{ANT.B1}$ and 440-1 through 440-$N_{ANT.B2}$ is divided into a Tx operation and an Rx operation. In the Rx operation, the RF/IF chains 430-1 through 430-$N_{ANT.B1}$ and 440-1 through 440-$N_{ANT.B2}$ may convert the RF signal 710 to the baseband signal 740. In the Tx operation, the RF/IF chains 430-1 through 430-$N_{ANT.B1}$ and 440-1 through 440-$N_{ANT.B2}$ may convert the baseband signal 740 to the RF signal 710.

1) Rx Operation of RF/IF Chains 430-1 Through 430-$N_{ANT.B1}$ and 440-1 Through 440-$N_{ANT.B2}$ In operation S810, the RF/IF chains 430-1 through 430-$N_{ANT.B1}$ and 440-1 through 440-$N_{ANT.B2}$ may receive the RF signal 710 from the antennas 410-1 through 410-$N_{ANT.B1}$ and 420-1 through 420-$N_{ANT.B2}$.

In operation S820, the RF/IF chains 430-1 through 430-$N_{ANT.B1}$ and 440-1 through 440-$N_{ANT.B2}$ may downconvert the RF signal 710 to an analog IF signal 720.

In operation S830, the RF/IF chains 430-1 through 430-$N_{ANT.B1}$ and 440-1 through 440-$N_{ANT.B2}$ may convert the analog IF signal 720 to a digital IF signal 730 using an analog-to-digital converter (ADC).

Depending on example embodiments, the RF/IF chains 430-1 through 430-$N_{ANT.B1}$ and 440-1 through 440-$N_{ANT.B2}$ may convert the RF signal 710 directly to the analog baseband signal 720 for a total operating frequency band, and then convert the analog baseband signal 720 to a digital baseband signal 730 using ADC.

In operation S840, the RF/IF chains 430-1 through 430-$N_{ANT.B1}$ and 440-1 through 440-$N_{ANT.B2}$ may perform a digital channelization of the digital IF signal 730 using at least one of a digital mixer or a digital filter, and may generate a baseband channel signal. The RF/IF chains 430-1 through 430-$N_{ANT.B1}$ and 440-1 through 440-$N_{ANT.B2}$ may perform a digital channelization corresponding to a maximum number of channels supported by the GRS apparatus 400, and a single antenna among the antennas 410-1 through 410-$N_{ANT.B1}$ and 420-1 through 420-$N_{ANT.B2}$ may transmit and receive a channel corresponding to the maximum number of channels.

In operation S850, the RF/IF chains 430-1 through 430-$N_{ANT.B1}$ and 440-1 through 440-$N_{ANT.B2}$ may transmit the baseband channel signal to the baseband transceiving processor 460A or 460B. Here, the RF/IF chains 430-1 through 430-$N_{ANT.B1}$ and 440-1 through 440-$N_{ANT.B2}$ may transmit the baseband channel signal to the BB-IF interface 450, and the BB-IF interface 450 may map the baseband channel signal to the baseband transceiving processor 460A or 460B.

2) Tx Operation of RF/IF Chains 430-1 Through 430-$N_{ANT.B1}$ and 440-1 Through 440-$N_{ANT.B2}$ In operation S910, the RF/IF chains 430-1 through 430-$N_{ANT.B1}$ and 440-1 through 440-$N_{ANT.B2}$ may receive the baseband channel signal 740 of a corresponding channel from the baseband transceiving processor 460A or 460B. The baseband transceiving processor 460A or 460B may transmit the baseband channel signal 740 to the BB-IF interface 450, and the BB-IF interface 450 may map the baseband channel signal 740 to the RF/IF chains 430-1 through 430-$N_{ANT.B1}$ and 440-1 through 440-$N_{ANT.B2}$.

In operation S920, the RF/IF chains 430-1 through 430-$N_{ANT.B1}$ and 440-1 through 440-$N_{ANT.B2}$ may perform a channelization of the baseband channel signal 740 in an IF band using at least one of a digital mixer or a digital filter. The RF/IF chains 430-1 through 430-$N_{ANT.B1}$ and 440-1 through 440-$N_{ANT.B2}$ may perform a digital channelization corresponding to a maximum number of channels supported by the GRS apparatus 400, and a single antenna among the antennas 410-1 through 410-$N_{ANT.B1}$ and 420-1 through 420-$N_{ANT.B2}$ may transmit and receive a channel corresponding to the maximum number of channels.

In operation S930, the RF/IF chains 430-1 through 430-$N_{ANT.B1}$ and 440-1 through 440-$N_{ANT.B2}$ may multiplex each channelized channel signal (for example, the digital IF signal 730).

In operation S940, the RF/IF chains 430-1 through 430-$N_{ANT.B1}$ and 440-1 through 440-$N_{ANT.B2}$ may convert each multiplexed channel signal (for example, the digital IF signal 730) to the analog IF signal 720 using a digital-to-analog converter (DAC).

In operation S950, the RF/IF chains 430-1 through 430-$N_{ANT.B1}$ and 440-1 through 440-$N_{ANT.B2}$ may upconvert the analog IF signal 720 to the RF signal 710.

Depending on example embodiments, the RF/IF chains 430-1 through 430-$N_{ANT.B1}$ and 440-1 through 440-$N_{ANT.B2}$ may perform a channelization of the baseband channel signal 740 in an baseband using at least one of a digital mixer or a digital filter, and then multiplex each channelized channel signal (for example, the digital baseband signal 730). The RF/IF chains 430-1 through 430-$N_{ANT.B1}$ and 440-1 through 440-$N_{ANT.B2}$ may convert each multiplexed channel signal to the analog baseband signal 720 using a DAC and then upconvert the analog baseband signal 720 directly to the RF signal 710.

The RF/IF chains 430-1 through 430-$N_{ANT.B1}$ and 440-1 through 440-$N_{ANT.B2}$ may transmit the RF signal 710 to the antennas 410-1 through 410-$N_{ANT.B1}$ and 420-1 through 420-$N_{ANT.B2}$ in operation S960.

Figure 10:
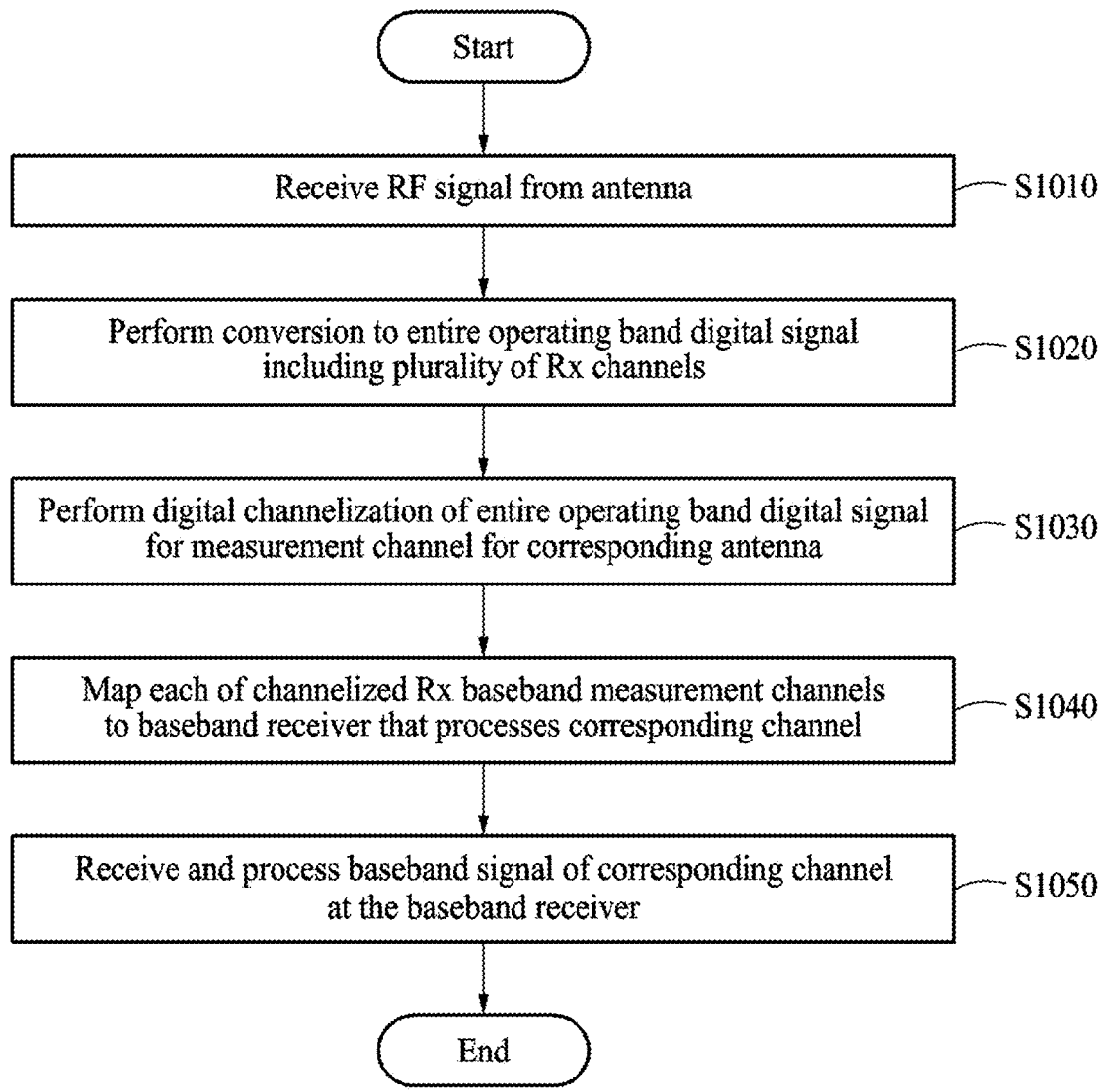
FIG. 10 is a diagram illustrating an example of an operation of measuring a signal quality of a specific channel in the GRS apparatus of FIG. 3.

FIG. 10 illustrates an example of an operation of measuring a signal quality of a specific channel in the GRS apparatus 400 of FIG. 4.

Referring to FIG. 10, in operation S1010, the antennas 410-1 through 410-$N_{ANT.B1}$ and 420-1 through 420-$N_{ANT.B2}$ may receive RF signals and may transfer the RF signals to the RF/IF chains 430-1 through 430-$N_{ANT.B1}$ and 440-1 through 440-$N_{ANT.B2}$. In operation S1020, the RF/IF chains 430-1 through 430-$N_{ANT.B1}$ and 440-1 through 440-$N_{ANT.B2}$ may convert the received RF signals to digital IF signals.

Here, each of the RF/IF chains 430-1 through 430-$N_{ANT.B1}$ and 440-1 through 440-$N_{ANT.B2}$ may include a digital channelization portion to measure an Rx quality of a specific channel received via a corresponding antenna among the antennas 410-1 through 410-$N_{ANT.B1}$ and 420-1 through 420-$N_{ANT.B2}$. The specific channel may refer to a measurement channel. In operation S1030, the digital channelization portion may perform a digital channelization for the measurement channel.

In an example, each of the RF/IF chains 430-1 through 430-$N_{ANT.B1}$ and 440-1 through 440-$N_{ANT.B2}$ may include a digital channelization portion configured to measure an Rx quality of a single measurement channel.

In another example, each of the RF/IF chains 430-1 through 430-$N_{ANT.B1}$ and 440-1 through 440-$N_{ANT.B2}$ may include a plurality of digital channelization portions to simultaneously measure Rx qualities of a plurality of measurement channels.

When the RF/IF chains 430-1 through 430-$N_{ANT.B1}$ and 440-1 through 440-$N_{ANT.B2}$ perform a digital channelization for a single specific channel, Rx qualities of a plurality of channels received from each of the antennas 410-1 through 410-$N_{ANT.B1}$ and 420-1 through 420-$N_{ANT.B2}$ may be sequentially measured.

For example, to measure an Rx quality of a channel 1 of a corresponding antenna among the antennas 410-1 through 410-$N_{ANT.B1}$ and 420-1 through 420-$N_{ANT.B2}$, the RF/IF chains 430-1 through 430-$N_{ANT.B1}$ and 440-1 through 440-$N_{ANT.B2}$ that are connected to the corresponding antenna may acquire an Rx baseband signal for the channel 1 through digital channelization for the channel 1. When a predetermined period of time elapses, the RF/IF chains 430-1 through 430-$N_{ANT.B1}$ and 440-1 through 440-$N_{ANT.B2}$ may sequentially measure Rx qualities of channels 2, 3 and 4 using the same scheme as described above.

The RF/IF chains 430-1 through 430-$N_{ANT.B1}$ and 440-1 through 440-$N_{ANT.B2}$ that are connected to antennas for each frequency band may transfer an acquired baseband signal for a measurement channel to the BB-IF interface 450 that processes a corresponding channel. In other words, A and B of the GRS apparatus 400 may provide a baseband signal for a measurement channel in addition to a plurality of Rx channel baseband signals that are described above, to the BB-IF interface 450.

In operation S1040, the BB-IF interface 450 may map a baseband signal for the measurement channel to the baseband transceiving processor 460A or 460B that processes a corresponding channel. The BB-IF interface 450 may simultaneously transfer baseband signals for the measurement channel to the baseband transceiving processor 460A or 460B for each frequency band and for each of the antennas 410-1 through 410-$N_{ANT.B1}$ and 420-1 through 420-$N_{ANT.B2}$.

In operation S1050, the baseband transceiving processor 460A or 460B may receive and process the baseband signals for the measurement channel mapped to a corresponding channel. For example, the baseband transceiving processor 460A or 460B may simultaneously receive the baseband signals for the measurement channel for each frequency band and for each of the antennas 410-1 through 410-$N_{ANT.B1}$ and 420-1 through 420-$N_{ANT.B2}$, and may simultaneously process a quality measurement of a plurality of the baseband signals for the measurement channel.

The baseband transceiving processor 460A or 460B may process a quality measurement of a single baseband signal for the measurement channel at a time, and accordingly an implementation complexity of a receiver may be mitigated. Here, the baseband transceiving processor 460A or 460B may sequentially measure qualities of the baseband signals for the measurement channel received for each frequency bands and for each of the antennas 410-1 through 410-$N_{ANT.B1}$ and 420-1 through 420-$N_{ANT.B2}$.

The baseband transceiving processor 460A or 460B may include an Rx channel quality measurement processor (not shown) configured to measure a quality of a received signal from antennas other than an antenna that processes a Tx/Rx channel baseband signal and that receives a corresponding channel among the antennas 410-1 through 410-$N_{ANT.B1}$ and 420-1 through 420-$N_{ANT.B2}$.

To measure a quality of a received signal, the Rx channel quality measurement processor may measure a received signal strength indicator (RSSI) or reference signal received power (RSRP) of a baseband signal for a measurement channel D and E of the GRS apparatus 400 may receive a baseband signal for a measurement channel in addition to the plurality of Rx channel baseband signals that are described above from the BB-IF interface 450.

The above-described operation of measuring the quality of the received signal for the measurement channel has been described for selection of a Tx antenna and Rx antenna, however, there is no limitation thereto. Accordingly, the operation may also be applicable to an operation, for example, a handover, that requires measurement of a quality of a received signal for a measurement channel.

Figure 11:
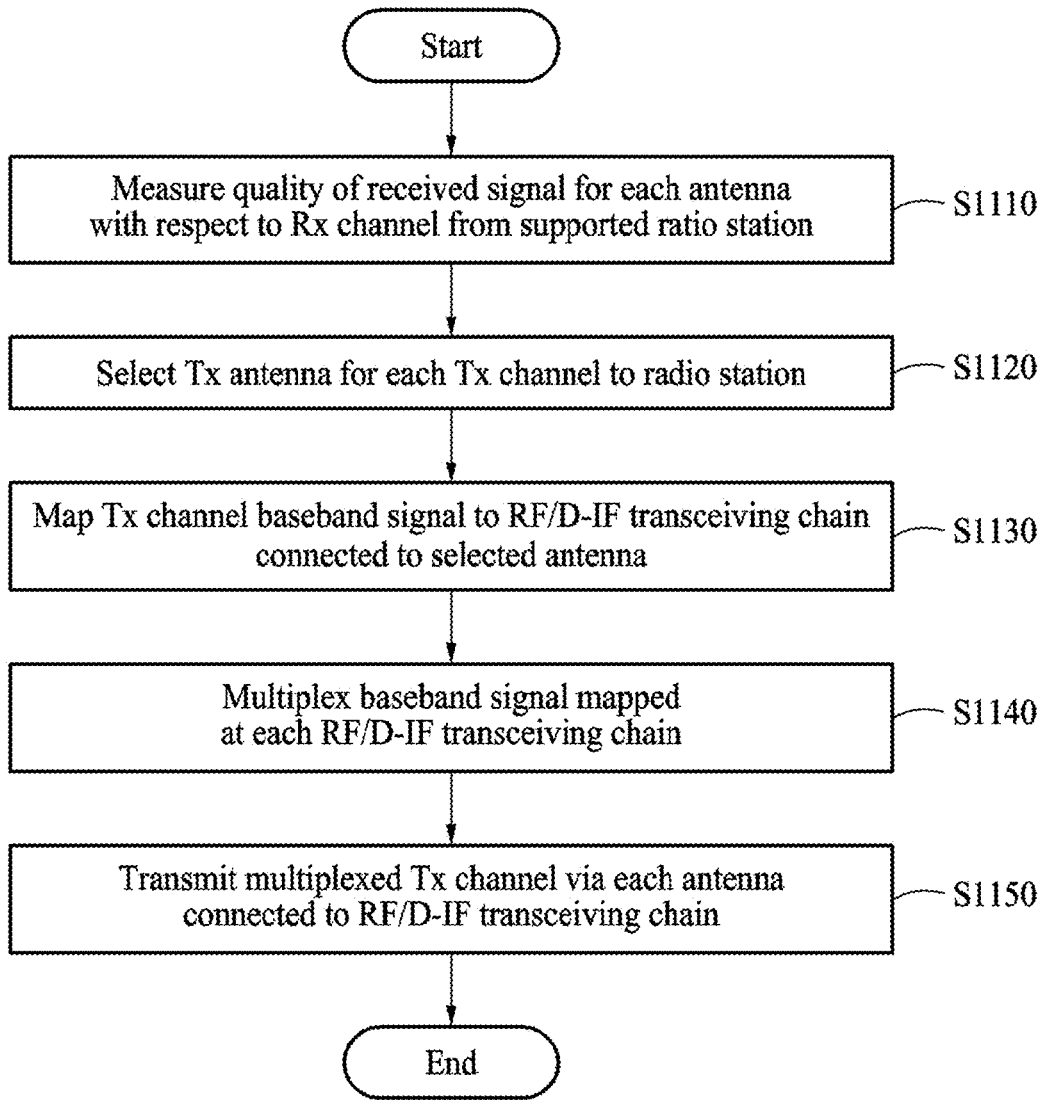
FIG. 11 is a diagram illustrating another example of a Tx operation of the GRS apparatus of FIG. 3.

FIG. 11 illustrates another example of a Tx operation of the GRS apparatus 400 of FIG. 3.

Referring to FIG. 11, in operation S1110, the GRS apparatus 400 may measure a quality of a received signal for each of the antennas 410-1 through 410-$N_{ANT.B1}$ and 420-1 through 420-$N_{ANT.B2}$ with respect to radio station apparatuses 301 that are supported by the GRS apparatus 400, as described above in FIG. 10.

In operation S1120, the GRS apparatus 400 may select an antenna from the antennas 410-1 through 410-$N_{ANT.B1}$ and 420-1 through 420-$N_{ANT.B2}$ for channel transmission to the radio station apparatus 301 based on the measured quality of the received signal. For example, the GRS apparatus 400 may measure an RSSI or RSRP of a baseband signal for a corresponding channel received for each of the antennas 410-1 through 410-$N_{ANT.B1}$ and 420-1 through 420-$N_{ANT.B2}$, and may select an antenna with a highest RSSI or highest RSRP. Accordingly, the GRS apparatus 400 may transmit a Tx channel to each of the radio station apparatuses 301 via at least one specific antenna at a specific moment.

The baseband transceiving processor 460A or 460B that processes a TX channel to the radio station apparatus 301 may generate a baseband signal for a corresponding channel and transfer the baseband signal to the BB-IF interface 450. In operation S1130, the BB-IF interface 450 may map the baseband signal to an RF/IF chain connected to the selected antenna among the RF/D-IF chains 430-1 through 430-$N_{ANT.B1}$ and 440-1 through 440-$N_{ANT.B2}$.

In operation S1140, each of the RF/IF chains 430-1 through 430-$N_{ANT.B1}$ and 440-1 through 440-$N_{ANT.B2}$ may multiplex the mapped baseband signal.

In an example, when the GRS apparatus 400 is of a P2P type, the same number of FDM Tx channels as a maximum number of radio station apparatuses 301 supported by the GRS apparatus 400 may be mapped to the RF/IF chains 430-1 through 430-$N_{ANT.B1}$ and 440-1 through 440-$N_{ANT.B2}$. In operation S1150, each of the RF/IF chains 430-1 through 430-$N_{ANT.B1}$ and 440-1 through 440-$N_{ANT.B2}$ may perform a digital channelization for the mapped FDM channels and may simultaneously transmit the FDM channels.

In another example, when the GRS apparatus 400 is of a P2MP type, an optimal Tx antenna may be selected from the antennas 410-1 through 410-$N_{ANT.B1}$ and 420-1 through 420-$N_{ANT.B2}$ for each TDM time slot assigned to each of the radio station apparatuses 301 in a single frequency channel. Accordingly, each TDM time slot assigned to each of the radio station apparatuses 301 may be mapped to an RF/IF chain connected to the selected Tx antenna among the RF/IF chains 430-1 through 430-$N_{ANT.B1}$ and 440-1 through 440-$N_{ANT.B2}$, and each of the RF/IF chains 430-1 through 430-$N_{ANT.B1}$ and 440-1 through 440-$N_{ANT.B2}$ may transmit a Tx channel to each of the radio station apparatuses 301 in the mapped TDM time slot through time switching. In other words, at a specific moment, a single TDM channel may be transmitted via a single antenna among the antennas 410-1 through 410-$N_{ANT.B1}$ and 420-1 through 420-$N_{ANT.B2}$ of the GRS apparatus 400.

Figure 12:
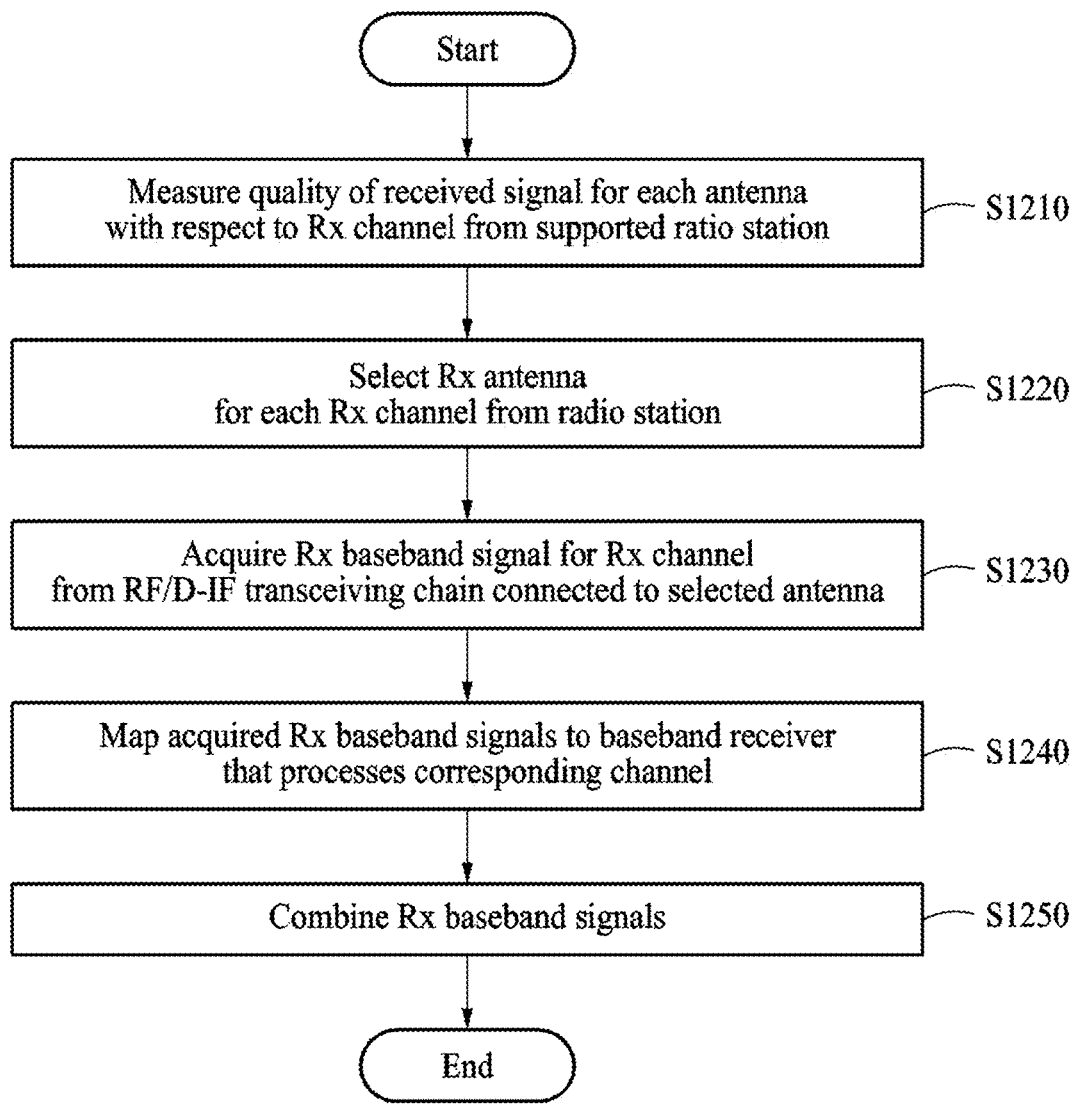
FIG. 12 is a diagram illustrating another example of an Rx operation of the GRS apparatus of FIG. 3.

FIG. 12 illustrates another example of an Rx operation of the GRS apparatus 400 of FIG. 3.

Referring to FIG. 12, in operation S1210, the GRS apparatus 400 may measure a quality of a received signal for each of the antennas 410-1 through 410-$N_{ANT.B1}$ and 420-1 through 420-$N_{ANT.B2}$ with respect to radio station apparatuses 301 that are supported by the GRS apparatus 400, as described above in FIG. 10.

In operation S1220, the GRS apparatus 400 may select an antenna from the antennas 410-1 through 410-$N_{ANT.B1}$ and 420-1 through 420-$N_{ANT.B2}$ for channel transmission to the radio station apparatus 301 based on the measured quality of the received signal. For example, the GRS apparatus 400 may measure an RSSI or RSRP of a baseband signal for a corresponding channel received for each of the antennas 410-1 through 410-$N_{ANT.B1}$ and 420-1 through 420-$N_{ANT.B2}$, and may select an antenna with a highest RSSI or a highest RSRP. Accordingly, the GRS apparatus 400 may transmit a Tx channel via at least two specific antennas to each of the radio station apparatuses 301 at a specific moment. In an example of a dual band operation and an example of an Rx operation via two specific antennas for each frequency band, the GRS apparatus 400 may consider combination of four received baseband signals.

In operation S1230, an RF/IF chain connected to the selected antenna among the RF/IF chains 430-1 through 430-$N_{ANT.B1}$ and 440-1 through 440-$N_{ANT.B2}$ may acquire an Rx channel baseband signal for a corresponding channel.

In operation S1240, Rx channel baseband signals acquired by corresponding RF/IF chains among the RF/IF chains 430-1 through 430-$N_{ANT.B1}$ and 440-1 through 440-$N_{ANT.B2}$ may be transferred via the BB-IF interface 450 to the baseband transceiving processor 460A or 460B that processes corresponding channels.

In operation S1250, the baseband transceiving processor 460A or 460B may combine the received Rx baseband signals, to acquire a diversity gain of a received signal.

Figure 13:
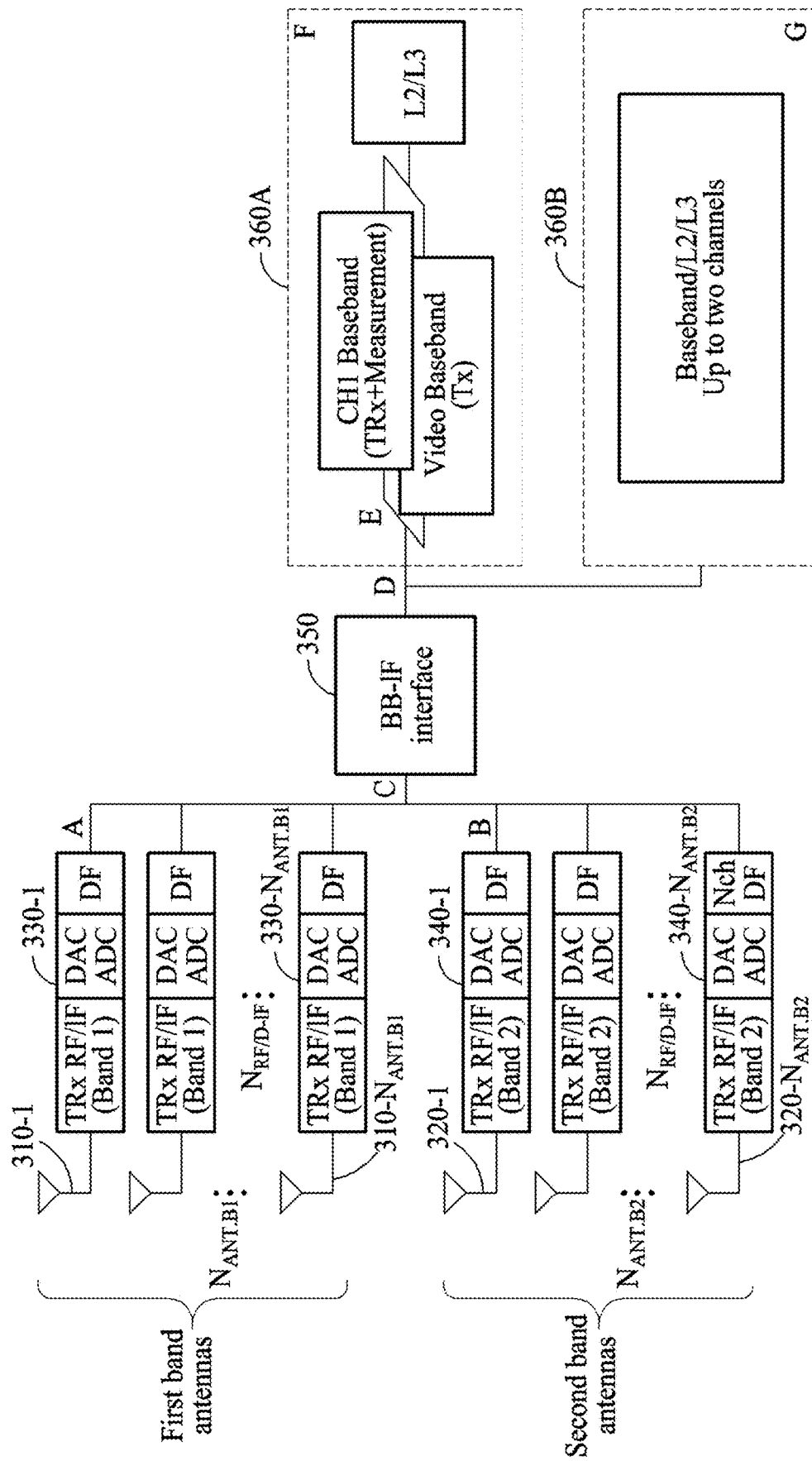
FIG. 13 is a diagram illustrating an example of a structure of a radio station apparatus of FIG. 3.

FIG. 13 illustrates an example of a structure of the radio station apparatus 301 of FIG. 3.

Referring to FIG. 13, an operation and configuration of the radio station apparatus 301 may be substantially similar to those of the GRS apparatus 400 of FIG. 3. Accordingly, the following description is provided based on a difference between the GRS apparatus 400 and the radio station apparatus 301.

The radio station apparatus 301 may include antennas 310-1 through 310-$N_{ANT.B1}$ and 320-1 through 320-$N_{ANT.B2}$, RF/IF chains 330-1 through 330-$N_{ANT.B1}$ and 340-1 through 340-$N_{ANT.B2}$, a BB-IF interface 350, and a baseband transceiving processor 360A or 360B.

To support a plurality of radio station apparatuses 301, the GRS apparatus 400 may support Tx and Rx of a video channel and a plurality of CNPC channels. The radio station apparatus 301 may support Tx of a video channel and Tx and Rx of a CNPC channel of the radio station apparatus 301.

Tx and Rx operations of the radio station apparatus 301 may be similar to those described above with reference to FIGS. 5 and 6.

In an Rx mode, the radio station apparatus 301 may perform a digital channelization for a CNPC channel of the radio station apparatus 301, may map the CNPC channel to the baseband transceiving processor 360A or 360B, and the baseband transceiving processor 360A or 360B may receive and process a baseband signal.

In a Tx mode, the radio station apparatus 301 may support a Tx operation of a video channel and the CNPC channel of the radio station apparatus 301. When the CNPC channel is transmitted, the radio station apparatus 301 may perform a Tx operation of a single Tx channel. When the CNPC channel and the video channel are simultaneously transmitted, the radio station apparatus 301 may perform a Tx operation of up to two Tx channels.

The radio station apparatus 301 may include the antennas 310-1 through 310-$N_{ANT.B1}$ and 320-1 through 320-$N_{ANT.B2}$, as tracking antennas requiring a high cost and high size, and thus it is possible to secure a reliability of a CNPC link.

Also, the radio station apparatus 301 may include at least two compact and lightweight antennas that are fixed among the antennas 310-1 through 310-$N_{ANT.B1}$ and 320-1 through 320-$N_{ANT.B2}$, and thus it is possible to secure a reliability of a CNPC link.

A type of antennas may be determined based on a size, a weight and cost constraints of the radio station apparatus 301, and may include, for example, at least two omnidirectional antennas or at least three patch antennas that are compact and lightweight.

The RF/IF chains 330-1 through 330-$N_{ANT.B1}$ and 340-1 through 340-$N_{ANT.B2}$ may be implemented as RF/D-IF chains as described above in FIGS. 8 and 9.

The RF/IF chains 330-1 through 330-$N_{ANT.B1}$ and 340-1 through 340-$N_{ANT.B2}$ may be connected to the BB-IF interface 350. The BB-IF interface 350 may function as an interface to connect a baseband channel transmitted to the RF/IF chains 330-1 through 330-$N_{ANT.B1}$ and 340-1 through 340-$N_{ANT.B2}$ and a baseband channel received from the RF/IF chains 330-1 through 330-$N_{ANT.B1}$ and 340-1 through 340-$N_{ANT.B2}$ to the baseband transceiving processor 360A or 360B.

The radio station apparatus 301 may transmit and receive a channel for controlling a UAV via at least one specific antenna. For example, the radio station apparatus 301 may transmit a signal generated at a transistor of the baseband transceiving processor 360A or 360B for each CNPC channel and video channel, via a single specific antenna or at least two specific antennas.

To this end, the BB-IF interface 350 may map a Tx baseband signal for each channel to one of the RF/IF chains 330-1 through 330-$N_{ANT.B1}$ and 340-1 through 340-$N_{ANT.B2}$ connected to a specific antenna that is used to transmit a corresponding channel signal among the antennas 310-1 through 310-$N_{ANT.B1}$ and 320-1 through 320-$N_{ANT.B2}$.

For example, when a signal for a CNPC channel generated at the baseband transceiving processor 360A or 360B is transmitted via a second antenna for each of a first frequency band and a second frequency band, the BB-IF interface 350 may map a baseband signal for the CNPC channel to a second RF/IF chain for each of the first frequency band and the second frequency band among the RF/IF chains 330-1 through 330-$N_{ANT.B1}$ and 340-1 through 340-$N_{ANT.B2}$. Accordingly, for each of the RF/IF chains 330-1 through 330-$N_{ANT.B1}$ and 340-1 through 340-$N_{ANT.B2}$, a number of baseband signals corresponding to a maximum number of channels (for example, up to two channels) supported by the radio station apparatus 301 may be mapped.

When channels are not simultaneously received in the first frequency band and the second frequency band at all times, or when different numbers are assigned to the antennas 310-1 through 310-$N_{ANT.B1}$ and 320-1 through 320-$N_{ANT.B2}$ as Rx antennas for each frequency band, the BB-IF interface 350 may properly map each of baseband signals (for channels) generated at the baseband transceiving processor 360A or 360B to the RF/IF chains 330-1 through 330-$N_{ANT.B1}$ and 340-1 through 340-$N_{ANT.B2}$ for each frequency band, based on an operation scenario.

For example, when the radio station apparatus 301 supports Tx of a single CNPC channel through the first frequency band and the second frequency band and supports Tx of a video channel through the first frequency band, A and B may provide interfaces (for example, PCIe or sRIO) that may support two Tx baseband signals and a single Tx baseband signal, respectively.

In the Rx mode, the radio station apparatus 301 may receive a signal for a single CNPC Rx channel via a single specific antenna or at least two specific antennas. The radio station apparatus 301 may receive a corresponding channel signal via at least two specific antennas, and may acquire a diversity gain of the received signal in a baseband.

The RF/IF chains 330-1 through 330-$N_{ANT.B1}$ and 340-1 through 340-$N_{ANT.B2}$ that are respectively connected to the antennas 310-1 through 310-$N_{ANT.B1}$ and 320-1 through 320-$N_{ANT.B2}$ may generate baseband signals for channels that is to receive signals via the connected antennas 310-1 through 310-$N_{ANT.B1}$ and 320-1 through 320-$N_{ANT.B2}$, through a digital channelization, and may transfer the generated baseband signals to a receiver of the baseband transceiving processor 360A or 360B so that the baseband signals may be received and processed. Here, the BB-IF interface 350 may map a baseband Rx channel generated by the RF/IF chains 330-1 through 330-$N_{ANT.B1}$ and 340-1 through 340-$N_{ANT.B2}$ to the receiver of the baseband transceiving processor 360A or 360B.

For example, when a CNPC channel is received via a second antenna 310-2 for the first frequency band and a third antenna 320-3 for the second frequency band, RF/IF chains 330-2 and 340-3 that are connected to the second antenna 310-2 and the third antenna 320-3 may acquire Rx baseband signals for the CNPC channel through a digital channelization. The BB-IF interface 350 may map the Rx baseband signals acquired by the RF/IF chains 330-2 and 340-3 to the receiver of the baseband transceiving processor 360A or 360B that processes the CNPC channel.

When CNPC channels are not received simultaneously in the first frequency band and the second frequency band at all times, or when different numbers are assigned to RX antennas for each frequency band, the BB-IF interface 350 may properly map each of baseband signals generated at the transmitter of the baseband transceiving processor 360A or 360B to the RF/IF chains 330-1 through 330-$N_{ANT.B1}$ and 340-1 through 340-$N_{ANT.B2}$ for each frequency band, based on an operation scenario. For example, when the radio station apparatus 301 receives a single CNPC channel through the first frequency band and the second frequency band, the RF/IF chains 330-1 through 330-$N_{ANT.B1}$ and 340-1 through 340-$N_{ANT.B2}$ for the first frequency band and the second frequency band may perform a channelization for up to one Rx channel, and A and B may provide interfaces (for example, PCIe or sRIO) that may support up to one Rx baseband signal.

The BB-IF interface 350 may be connected to the baseband transceiving processor 360A or 360B. The baseband transceiving processor 360A may include a plurality of transceiving modules that process a specific channel, or the baseband transceiving processor 360B may include a single module that processes Tx and Rx of all channels, as described above in FIG. 4.

The baseband transceiving processor 360A or 360B may be implemented as an FPGA, a DSP, and the like.

In an example, when the baseband transceiving processor 360A or 360B is implemented as an FPGA, a plurality of transceiving modules may be included in the baseband transceiving processor 360A or 360B. In another example, when the baseband transceiving processor 360A or 360B is implemented as a DSP, a single module to process Tx and Rx of all channels may be included in the baseband transceiving processor 360A or 360B. Here, a number of channels processed by a single module may change based on specifications of an FPGA or DSP.

The baseband transceiving processor 360A that processes a specific channel may transfer a signal for a Tx baseband channel to the BB-IF interface 350, and the BB-IF interface 350 may map the signal to the RF/IF chains 330-1 through 330-$N_{ANT.B1}$ and 340-1 through 340-$N_{ANT.B2}$ that are connected to Tx antennas for the Tx baseband channel among the antennas 310-1 through 310-$N_{ANT.B1}$ and 320-1 through 320-$N_{ANT.B2}$. Also, the baseband transceiving processor 360A may receive a signal for an Rx baseband channel from the BB-IF interface 350. The BB-IF interface 350 may receive the signal for the Rx baseband channel from RF/IF chains 330-1 through 330-$N_{ANT.B1}$ and 340-1 through 340-$N_{ANT.B2}$ that are connected to Rx antennas for the Rx baseband channel among the antennas 310-1 through 310-$N_{ANT.B1}$ and 320-1 through 320-$N_{ANT.B2}$.

When the same Tx baseband signals are transmitted to the first frequency band and the second frequency band, the baseband transceiving processor 360A may transmit a single Tx baseband signal per specific channel to the BB-IF interface 350. When different Tx baseband signals are transmitted to the first frequency band and the second frequency band, the baseband transceiving processor 360A may transfer a Tx baseband signal for the first frequency band and a Tx baseband signal for the second frequency band per specific channel to the BB-IF interface 350.

The baseband transceiving processor 360A may receive Rx baseband signals corresponding to a number of antennas that perform Rx for each frequency band from the BB-IF interface 350. For example, the baseband transceiving processor 360A may receive a CNPC channel from the first frequency band and the second frequency band and may receive signals via two antennas per band. The baseband transceiving processor 360A that processes the CNPC channel may receive two Rx baseband signals per band from the BB-IF interface 350. In other words, E of the baseband transceiving processor 360A may provide an interface that may support Ni Tx baseband signals (for example, Ni is 1 when the same signal is transmitted in a single band or a dual band, and Ni is 2 when different signals are transmitted in a dual band), support "2×$N_{RxANT}$" (that is, a number of combined Rx antennas) Rx baseband signals, and support Ne Tx baseband signals (for example, Ne is 1 when the same signal is transmitted in a single band or a dual band, and Ne is 2 when different signals are transmitted in a dual band) in the case of a video channel baseband transmitter.

The baseband transceiving processor 360B may process Tx and Rx of all channels using a single module. Accordingly, D may provide an interface that may support "Ni+Ne" Tx baseband signals and support "N'ch×2×$N_{RxANT}$" Rx baseband signals when "N'ch" (for example, 1) Rx channels are present.

The radio station apparatus 301 may properly select a Tx antenna and an Rx antenna for each support channel, and may perform Tx and Rx of a corresponding channel. In other words, the radio station apparatus 301 may select the Tx antenna and the Rx antenna based on an operation of measuring a quality of a received signal. The operation of measuring a quality of a received signal may also be applicable to operations, for example, a handover as well as selection of Tx/Rx antennas, that require measurement of a quality of a received signal for a measurement channel.

The radio station apparatus 301 may perform Tx and Rx of channels via a plurality of antennas based on the operation of measuring a quality of a received signal. The radio station apparatus 301 may select an optimal Tx antenna based on a CNPC Rx channel of the radio station apparatus 301 and may transmit a CNPC channel and a video channel via the optimal Tx antenna.

For example, when a radio station apparatus 301 including two antennas supports a combination of baseband signals for the two antennas, an Rx antenna may not need to be selected. The radio station apparatus 301 may measure an RSSI or an RSRP of a baseband signal for an Rx channel of an Rx antenna, and may select a Tx antenna based on the RSSI or RSRP, instead of requiring a separate operation and configuration for measuring a quality of a received signal for a measurement channel. In this example, the operation and configuration for measuring a quality of a received signal for a measurement channel may be used to measure an Rx quality for a measurement channel for a handover.

The components described in the example embodiments may be implemented by hardware components including, for example, at least one DSP, a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The modules, apparatuses, and other components described herein may be implemented using a hardware component, a software component and/or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A ground radio station (GRS) apparatus comprising:
a first plurality of band antennas and a second plurality of band antennas configured to transmit and receive a radio frequency (RF) signal;
a first plurality of RF and/or intermediate frequency (IF) (RF/IF) chains and a second plurality of RF/IF chains configured to perform a conversion between the RF signal and a baseband signal;
a plurality of baseband transceiving processors configured to transmit and receive the baseband signal; and
a BB-IF interface configured to map the baseband signal to the RF/IF chain supporting a channel corresponding to the baseband signal among the first plurality of RF/IF chains and the second plurality of RF/IF chains, or to map the baseband signal to the baseband transceiving processor supporting a channel corresponding to the baseband signal among the plurality of baseband transceiving processors,
wherein each of the first plurality of RF/IF chains are connected to each of the first plurality of band antennas, and each of the second plurality of RF/IF chains are connected to each of the second plurality of band antennas, and
wherein each of the first plurality of band antennas has a channel in a first frequency band, and each of the second plurality of band antennas has a channel in a second frequency band.

2. The GRS apparatus of claim 1, wherein
the RF signal has a C-band frequency or an L-band frequency.

3. The GRS apparatus of claim 1, wherein each of the RF/IF chains is configured to convert the RF signal for a total operating frequency band including any assignable channel frequency segments to the baseband channel signal in a reception (Rx) mode, and configured to convert the baseband channel signal to the RF signal for the total operating frequency band in a transmission (Tx) mode.

4. The GRS apparatus of claim 1, wherein the BB-IF interface is configured to map the baseband channel signal from the RF/IF chains to the baseband transceiving processors in an Rx mode, and is configured to map the baseband signal from the baseband channel transceiving processors to the RF/IF chains in a Tx mode.

5. The GRS apparatus of claim 1, wherein in an Rx mode, each of the RF/IF chains is configured to downconvert the RF signal for an total operating frequency bands including any assignable channel frequency segments to an analog IF signal, to convert the analog IF or baseband signal to a digital IF or baseband signal using an analog-to-digital converter (ADC) and analog low pass filter (LPF), and to channelize the digital IF or baseband signal to the baseband channel signal using a digital channelization.

6. The GRS apparatus of claim 1, wherein in a Tx mode, each of the RF/IF chains is configured to convert the baseband channel signal to a digital IF or baseband signal for the total operating frequency bands including any assignable channel frequency segments using a digital channelization, to convert the digital IF or baseband signal to an analog IF or baseband signal for the total operating frequency bands using a digital-to-analog converter (DAC), and to upconvert the analog IF or baseband signal to the RF signal.

7. The GRS apparatus of claim 6, wherein each of the RF/IF chains is configured to multiplex the digital IF or baseband signals.

8. The GRS apparatus of claim 1, wherein
each of the RF/IF chains is configured to digital-channelize a specific channel received from a connected antenna,
the BB-IF interface is configured to map the digital-channelized channel to the plurality of baseband transceiving processors, and
the plurality of baseband transceiving processors are configured to measure a signal quality of the specific channel receiving from the connected antenna based on the digital-channelized channel.

9. The GRS apparatus of claim 8, wherein
the plurality of baseband transceiving processors are configured to select a Tx antenna among the antennas for each Tx channel based on the signal quality of the specific channel,
the BB-IF interface is configured to map the baseband channel signal to an RF/IF chain connected to the Tx antenna among the RF/IF chains, and
the RF/IF chain connected to the Tx antenna is configured to multiplex the baseband signals and transmit the multiplexed signal to the Tx antenna.

10. The GRS apparatus of claim 8, wherein
the RF/IF chains connected to the Rx antennas for each Rx channel are configured to receive the baseband signals from the Rx antenna,
the BB-IF interface is configured to map the baseband signals to the baseband transceiving processor that processes the specific channel among the baseband transceiving processors, and
the baseband transceiving processors are configured to select the Rx antenna based on the signal quality and to combine a plurality of baseband signals from the mapped Rx antennas.

11. A radio station apparatus included in an unmanned aerial vehicle (UAV), the radio station apparatus comprising:
a first plurality of band antennas and a second plurality of band antennas configured to transmit and receive an RF signal of the total operating frequency band including at least one of a video channel or a CNPC channel of the UAV;
a first plurality of RF and/or intermediate frequency (IF) (RF/IF) chains and a second plurality of RF/IF chains configured to perform a conversion between the RF signal for the total operating frequency band and a baseband signal for an assigned channel frequency segment;
a plurality of baseband transceiving processor configured to transmit and receive the baseband channel signal; and
a BB-IF interface configured to map the baseband channel signal to the RF/IF chain supporting a channel corresponding to the baseband signal among the first plurality of RF/IF chains and the second plurality of RF/IF chains, or to map the baseband signal to the baseband transceiving processor supporting a channel corresponding to the baseband signal among the plurality of baseband transceiving processors,
wherein each of the first plurality of RF/IF chains are connected to each of the first plurality of band antennas, and each of the second plurality of RF/IF chains are connected to each of the second plurality of band antennas, and
wherein each of the first plurality of band antennas has a channel in a first frequency band, and each of the second plurality of band antennas has a channel in a second frequency band.

12. The radio station apparatus of claim 11, wherein each of the RF/IF chains are configured to convert the RF signal for a total operating frequency band to the baseband channel signal in a reception (Rx) mode, and configured to convert the baseband channel signal to the RF signal for the total operating frequency band in a transmission (Tx) mode.

13. The radio station apparatus of claim 11, wherein the BB-IF interface is configured to map the baseband channel signal from the RF/IF chains to the baseband transceiving processors in an Rx mode, and is configured to map the baseband channel signal from the baseband transceiving processors to the RF/IF chains in a Tx mode.

14. The radio station apparatus of claim 11, wherein in an Rx mode, each of the RF/IF chain is configured to downconvert the RF signal for an total operating frequency bands including any assignable channel frequency segments to an analog IF or baseband signal, to convert the analog IF or baseband signal to a digital IF or baseband signal using an analog-to-digital converter (ADC) and a LPF, and to channelize the digital IF or baseband signal to the baseband channel signal using a digital channelization.

15. The radio station apparatus of claim 11, wherein in a Tx mode, each of the RF/IF chains are configured to convert the baseband channel signal to a digital IF or a baseband signal for the total operating frequency band including any assignable frequency segments using a digital channelization, to convert the digital IF or baseband signal to an analog IF or baseband signal using a digital-to-analog converter (DAC), and to upconvert the analog IF or baseband signal to the RF signal for the total operating frequency band.

16. The radio station apparatus of claim 15, wherein each of the RF/IF chains are configured to multiplex the digital IF or baseband signals.

17. The radio station apparatus of claim 11, wherein
each of the RF/IF chains are configured to digital-channelize a specific channel received from the antenna,
the BB-IF interface is configured to map the digital-channelized channel to the plurality of baseband transceiving processors, and
the plurality of baseband transceiving processors are configured to measure a signal quality of the specific channel receiving from the connected antenna based on the digital-channelized channel.

18. The radio station apparatus of claim 17, wherein
the plurality of baseband transceiving processors are configured to select a Tx antenna among the antennas for each Tx channel based on the signal quality of the specific channel,
the BB-IF interface is configured to map the baseband channel signal to an RF/IF chain connected to the Tx antenna among the RF/IF chains, and the RF/IF chain connected to the Tx antenna is configured to multiplex the baseband channel signals and transmit the multiplexed signal to the Tx antenna.

19. The radio station apparatus of claim 17, wherein the RF/IF chains connected to the Rx antennas for each Rx channel are configured to receive the baseband signal from the Rx antenna, the BB-IF interface is configured to map the baseband signal to the baseband transceiving processor that processes the specific channel among the baseband transceiving processors, and the baseband transceiving processors are configured to select the Rx antenna based on the signal quality and to combine a plurality of baseband signals from the mapped Rx antennas.

* * * * *